United States Patent
Staring et al.

(10) Patent No.: US 10,615,646 B2
(45) Date of Patent: Apr. 7, 2020

(54) WIRELESS INDUCTIVE POWER TRANSFER

(71) Applicant: KONINKLIJKE PHILIPS N.V., Eindhoven (NL)

(72) Inventors: Antonius Adriaan Maria Staring, Eindhoven (NL); Andries Van Wageningen, Wijlre (NL)

(73) Assignee: Koninklijke Philips N.V., Eindhoven (NL)

(*) Notice: Subject to any disclaimer, the term of this patent is extended or adjusted under 35 U.S.C. 154(b) by 206 days.

(21) Appl. No.: 14/903,308

(22) PCT Filed: Jul. 15, 2014

(86) PCT No.: PCT/EP2014/065061
§ 371 (c)(1),
(2) Date: Jan. 7, 2016

(87) PCT Pub. No.: WO2015/007696
PCT Pub. Date: Jan. 22, 2015

(65) Prior Publication Data
US 2016/0149440 A1  May 26, 2016

Related U.S. Application Data

(60) Provisional application No. 61/871,378, filed on Aug. 29, 2013.

(30) Foreign Application Priority Data

Jul. 17, 2013 (EP) ..................................... 13176785

(51) Int. Cl.
*H02J 50/60* (2016.01)
*H02J 50/80* (2016.01)
(Continued)

(52) U.S. Cl.
CPC ................ *H02J 50/60* (2016.02); *G01V 3/10* (2013.01); *H02J 5/005* (2013.01); *H02J 50/10* (2016.02); *H02J 50/80* (2016.02)

(58) Field of Classification Search
CPC .. H02J 50/60; H02J 50/80; H02J 50/10; H02J 5/005; H02J 5/025; G01V 3/10;
(Continued)

(56) References Cited

U.S. PATENT DOCUMENTS

2008/0183344 A1* 7/2008 Doyen ................. G08B 3/10
701/9
2009/0108679 A1* 4/2009 Porwal ................. H02J 7/025
307/104

(Continued)

FOREIGN PATENT DOCUMENTS

DE  102011050655 A1  11/2012
EP  2442430 A1  4/2012

(Continued)

OTHER PUBLICATIONS

QI Wireless Power Consortium, Downloaded From http://www.wirelesspowerconsortium.com/index.html on Sep. 9, 2015; 7 Pages.

(Continued)

*Primary Examiner* — Patrick C Chen

(57) ABSTRACT

A wireless power transfer system includes a power transmitter (101) arranged to provide a power transfer to a power receiver (105) via a wireless inductive power signal. A parasitic power loss detector (207) is arranged to detect a parasitic power loss for the power transfer, and a user indicator (209) is arranged to initialize a user alert in response to the detection of the parasitic power loss. The system comprises an input (211) for receiving user inputs; and a controller (213) which is arranged to initiate an adaptation of a parasitic power loss detection operation performed by the parasitic power loss detector (207) to detect parasitic power losses if a user input meeting a criterion is not received. Each of the individual features may be implemented in the power transmitter (101), the power receiver (105), or may e.g. be distributed between these. The approach may allow improved foreign object detection in a wireless power transfer system.

27 Claims, 7 Drawing Sheets

(51) Int. Cl.
*H02J 5/00* (2016.01)
*H02J 50/10* (2016.01)
*G01V 3/10* (2006.01)

(58) Field of Classification Search
CPC ........ G01V 3/101; G01V 3/102; G01V 3/104; G01V 3/105; G01V 3/107; G01V 3/108
USPC .......................................................... 307/104
See application file for complete search history.

(56) References Cited

U.S. PATENT DOCUMENTS

| | | | |
|---|---|---|---|
| 2010/0013320 A1 | 1/2010 | Shiozaki et al. | |
| 2010/0031120 A1 | 1/2010 | Shiozake et al. | |
| 2010/0039066 A1* | 2/2010 | Yuan ................. | H02J 50/12 320/108 |
| 2012/0040723 A1* | 2/2012 | Kurihara ............ | H04M 1/0266 455/566 |
| 2012/0077537 A1* | 3/2012 | Muratov ............. | H04B 5/0037 455/522 |
| 2012/0205988 A1 | 8/2012 | Tanabe | |
| 2012/0212070 A1* | 8/2012 | Tanabe ................ | H02J 5/005 307/104 |
| 2013/0094598 A1* | 4/2013 | Bastami .............. | H02J 5/005 375/259 |
| 2014/0001881 A1 | 1/2014 | Murakami et al. | |
| 2014/0191715 A1 | 7/2014 | Wechlin et al. | |
| 2014/0239735 A1 | 8/2014 | Abe et al. | |

FOREIGN PATENT DOCUMENTS

| | | |
|---|---|---|
| WO | 2012132818 A1 | 10/2012 |
| WO | 2013035853 A1 | 3/2013 |
| WO | 2014060871 A1 | 4/2014 |

OTHER PUBLICATIONS

System Description, Wireless Power Transfer, vol. I: Low Power, Part 1: Interface Definition, 2013, pp. 1-124.

Leach et al "Experimental Thermal Burns, Especially the Moderate Temperature Burn" Experimental Physiology, vol. 32, p. 67-86 (Jan. 1, 1943).

* cited by examiner

WIRELESS INDUCTIVE POWER TRANSFER

CROSS-REFERENCE TO PRIOR APPLICATIONS

This application is the U.S. National Phase application under 35 U.S.C. § 371 of International Application No. PCT/EP2014/065061, filed on Jul. 15, 2014, which claims the benefit of European Patent Application No. 13176785.7, filed on Jul. 17, 2013 and U.S. Provisional Application 61/871,378, filed on Aug. 29, 2013. These applications are hereby incorporated by reference herein.

FIELD OF THE INVENTION

The invention relates to inductive power transfer and in particular, but not exclusively, to an inductive power transfer system in accordance with the Qi wireless power transfer standard.

BACKGROUND OF THE INVENTION

The number and variety of portable and mobile devices in use have exploded in the last decade. For example, the use of mobile phones, tablets, media players etc. has become ubiquitous. Such devices are generally powered by internal batteries and the typical use scenario often requires recharging of batteries or direct wired powering of the device from an external power supply.

Most present day systems require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each being dedicated to a specific device. Although, the use of internal batteries may avoid the need for a wired connection to a power supply during use, this only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers, having a tight coupling between primary transmitter coil and a secondary receiver coil. By separating the primary transmitter coil and the secondary receiver coil between two devices, wireless power transfer between these becomes possible based on the principle of a loosely coupled transformer.

Such an arrangement allows a wireless power transfer to the device without requiring any wires or physical electrical connections to be made. Indeed, it may simply allow a device to be placed adjacent to or on top of the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer standard known as the Qi standard has been defined and is currently being developed further. This standard allows power transmitter devices that meet the Qi standard to be used with power receiver devices that also meet the Qi standard without these having to be from the same manufacturer or having to be dedicated to each other. The Qi standard further includes some functionality for allowing the operation to be adapted to the specific power receiver device (e.g. dependent on the specific power drain).

The Qi standard is developed by the Wireless power Consortium and more information can e.g. be found on their website: http://www.wirelesspowerconsortium.com/index.html, where in particular the defined Standards documents can be found.

The Qi wireless power standard describes that a power transmitter must be able to provide a guaranteed power to the power receiver. The specific power level needed depends on the design of the power receiver. In order to specify the guaranteed power, a set of test power receivers and load conditions are defined which describe the guaranteed power level for each of the conditions.

Qi originally defined a wireless power transfer for low power devices considered to be devices having a power drain of less than 5 W. Systems that fall within the scope of this standard use inductive coupling between two planar coils to transfer power from the power transmitter to the power receiver. The distance between the two coils is typically 5 mm. It is possible to extend that range to at least 40 mm.

However, work is ongoing to increase the available power, and in particular the standard is being extended to mid-power devices being devices having a power drain of more than 5 W.

The Qi standard defines a variety of technical requirements, parameters and operating procedures that a compatible device must meet.

Communication

The Qi standard supports communication from the power receiver to the power transmitter thereby enabling the power receiver to provide information that may allow the power transmitter to adapt to the specific power receiver. In the current standard, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The unidirectional communication is achieved by the power receiver performing load modulation wherein a loading applied to the secondary receiver coil by the power receiver is varied to provide a modulation of the power signal. The resulting changes in the electrical characteristics (e.g. variations in the current draw) can be detected and decoded (demodulated) by the power transmitter.

Thus, at the physical layer, the communication channel from power receiver to the power transmitter uses the power signal as a data carrier. The power receiver modulates a load which is detected by a change in the amplitude and/or phase of the transmitter coil current or voltage. The data is formatted in bytes and packets.

More information can be found in chapter 6 of part 1 the Qi wireless power specification (version 1.0).

Although Qi uses a unidirectional communication link, it has been proposed to introduce communication from the power transmitter to the power receiver. However, such a bidirectional link is not trivial to include and is subject to a large number of difficulties and challenges. For example, the resulting system still needs to be backwards compatible and e.g. power transmitters and receivers that are not capable of bidirectional communication still need to be supported. Furthermore, the technical restrictions in terms of e.g. modulation options, power variations, transmission options etc. are very restrictive as they need to fit in with the existing parameters. It is also important that cost and complexity is kept low, and e.g. it is desirable that the requirement for additional hardware is minimized, that detection is easy and reliable, etc. It is also important that the communication from the power transmitter to the power receiver does not impact, degrade or interfere with the communication from the power receiver to the power transmitter. Furthermore, an all-important requirement is that the communication link does not unacceptably degrade the power transfer ability of the system.

Accordingly, many challenges and difficulties are associated with enhancing a power transfer system such as Qi to include bidirectional communication.

System Control

In order to control the wireless power transfer system, the Qi standard specifies a number of phases or modes that the system may be in at different times of the operation. More details can be found in chapter 5 of part 1 the Qi wireless power specification (version 1.0).

The system may be in the following phases:

Selection Phase

This phase is the typical phase when the system is not used, i.e. when there is no coupling between a power transmitter and a power receiver (i.e. no power receiver is positioned close to the power transmitter).

In the selection phase, the power transmitter may be in a stand-by mode but will sense in order to detect a possible presence of an object. Similarly, the receiver will wait for the presence of a power signal.

Ping Phase:

If the transmitter detects the possible presence of an object, e.g. due to a capacitance change, the system proceeds to the ping phase in which the power transmitter (at least intermittently) provides a power signal. This power signal is detected by the power receiver which proceeds to send an initial package to the power transmitter. Specifically, if a power receiver is present on the interface of the power transmitter, the power receiver communicates an initial signal strength packet to the power transmitter. The signal strength packet provides an indication of the degree of coupling between the power transmitter coil and the power receiver coil. The signal strength packet is detected by the power transmitter.

Identification & Configuration Phase:

The power transmitter and power receiver then proceeds to the identification and configuration phase wherein the power receiver communicates at least an identifier and a required power. The information is communicated in multiple data packets by load modulation. The power transmitter maintains a constant power signal during the identification and configuration phase in order to allow the load modulation to be detected. Specifically, the power transmitter provides a power signal with constant amplitude, frequency and phase for this purpose (except from the change caused by load-modulation).

In preparation of the actual power transfer, the power receiver can apply the received signal to power up its electronics but it keeps its output load disconnected. The power receiver communicates packets to the power transmitter. These packets include mandatory messages, such as the identification and configuration packet, or may include some defined optional messages, such as an extended identification packet or power hold-off packet.

The power transmitter proceeds to configure the power signal in accordance with the information received from the power receiver.

Power Transfer Phase:

The system then proceeds to the power transfer phase in which the power transmitter provides the required power signal and the power receiver connects the output load to supply it with the received power.

During this phase, the power receiver monitors the output load conditions, and specifically it measures the control error between the actual value and the desired value of a certain operating point. It communicates these control errors in control error messages to the power transmitter with a minimum rate of e.g. every 250 msec. This provides an indication of the continued presence of the power receiver to the power transmitter. In addition the control error messages are used to implement a closed loop power control where the power transmitter adapts the power signal to minimize the reported error. Specifically, if the actual value of the operating point equals the desired value, the power receiver communicates a control error with a value of zero resulting in no change in the power signal. In case the power receiver communicates a control error different from zero, the power transmitter will adjust the power signal accordingly.

A potential problem with wireless power transfer is that power may unintentionally be transferred to e.g. metallic objects. For example, if a foreign object, such as e.g. a coin, key, ring etc., is placed upon the power transmitter platform arranged to receive a power receiver, the magnetic flux generated by the transmitter coil will introduce eddy currents in the metal objects which will cause the objects to heat up. The heat increase may be very significant and may indeed result in a risk of pain and damage to humans subsequently picking up the objects.

Experiments have shown that metal objects positioned at the surface of a power transmitter can reach an undesired high temperature (higher than 60° C.) at normal environment temperatures (20° C.) even for power dissipation in the object being as low as 500 mW. For comparison, skin burning caused by contact with hot objects starts at temperatures of around 65° C. The experiments have indicated that a power absorption of 500 mW or more in a typical foreign object rises its temperature to an unacceptable level.

In order to prevent such scenarios, it has been proposed to introduce foreign object detection where the power transmitter can detect the presence of a foreign object and reduce the transmit power. For example, the Qi system includes functionality for detecting a foreign object, and for reducing power if a foreign object is detected.

The power dissipation in a foreign object can be estimated from the difference between transmitted and received power. In order to prevent that too much power is dissipated in a foreign object, the transmitter can terminate the power transfer if the power loss exceeds a threshold.

In the current Qi Standard the preferred approach is to determine the power loss across the interface between the power transmitter and the power receiver in order to determine any loss in foreign objects. For this purpose, the power receiver estimates the amount of power that enters its interface surface—i.e. the received power. In order to generate the estimate, the power receiver measures the amount of power provided to the load, and adds an estimate of the losses in components—coil, resonant capacitor, rectifier, etc., as well as losses in conductive elements of the device, such as in metal parts that are not exposed to the user. The power receiver communicates the determined received power estimate to the power transmitter at regular intervals.

The power transmitter estimates the amount of power extracted from the power signal—i.e. the transmitted power. The power transmitter can then calculate the difference between the transmitted power and the received power, and if the difference exceeds a given level, the power transmitter may determine that a situation has occurred where an unacceptable power may be dissipated in a foreign object. For example, a foreign object may be positioned on or near the power transmitter resulting in this being heated due to the power signal. If the power loss exceeds a give threshold, the power transmitter terminates the power transfer in order to prevent the object from getting too hot. More details can be found in the Qi Standard, System Description Wireless power.

When performing this power loss detection, it is important that the power loss is determined with sufficient accuracy to ensure that the presence of a foreign object is detected. Firstly, it must be ensured that a foreign object which absorbs significant power from the magnetic field is detected. In order to ensure this, any error in estimating the power loss calculated from the transmitted and received power must be less than the acceptable level for power absorption in a foreign object. Similarly, in order to avoid false detections, the accuracy of the power loss calculation must be sufficiently accurate to not result in estimated power loss values that are too high when no foreign object is present.

It is substantially more difficult to determine the transmitted and received power estimates sufficiently accurately at higher power levels than for lower power levels. For example, assuming that an uncertainty of the estimates of the transmitted and received power is ±3%, this can lead to an error of ±150 mW at 5 W transmitted and received power, and
±1.5 W at 50 W transmitted and received power.

Thus, whereas such accuracy may be acceptable for a low power transfer operation it is not acceptable for a high power transfer operation.

Typically, it is required that the power transmitter must be able to detect power consumption of foreign objects of only 350 mW or even lower. This requires very accurate estimation of the received power and the transmitted power. This is particularly difficult at high power levels, and frequently it is difficult for power receivers to generate estimates that are sufficiently accurate. However, if the power receiver overestimates the received power, this can result in power consumption by foreign objects not being detected. Conversely, if the power receiver underestimates the received power, this may lead to false detections where the power transmitter terminates the power transfer despite no foreign objects being present.

In order to obtain the desired accuracy, it has been proposed that the power transmitter and power receiver are calibrated to each other before power transfer at least at higher levels is performed. However, although such an approach may be desirable in many scenarios, it may also be considered inconvenient to the user as such calibrations may at best delay the power transfer, and may in many scenarios require user involvement before power transfer can proceed.

An improved power transfer system would be advantageous. In particular, an approach that allows improved operation while maintaining a user friendly approach would be advantageous. Particularly, an approach that allows easier user operation while ensuring safe operation, especially at higher power levels, would be advantageous. An improved power transfer system allowing increased flexibility, facilitated implementation, facilitated operation, safer operation, reduced risk of foreign object heating, increased accuracy and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a wireless power transfer system including a power transmitter arranged to provide a power transfer to a power receiver via a wireless inductive power signal, the wireless power transfer system comprising: a parasitic power loss detector arranged to generate a parasitic power loss detection for the power transfer if a parasitic power loss estimate is outside a range; a user indicator for initializing a user alert in response to the parasitic power loss detection; an input for, in response to the parasitic power loss detection, receiving a user input indicating a presence of a foreign object or an absence of a foreign object; and a controller arranged to initiate an adaptation of a parasitic power loss detection operation performed by the parasitic power loss detector to generate the parasitic power loss detection if the user input indicates an absence of a foreign object, and to not initiate the adaptation of the parasitic power loss detection operation if the user input indicates a presence of a foreign object, the adaptation comprising a modification of a parameter of the parasitic power loss detection operation.

The approach may provide improved operation in many scenarios. In particular, in many embodiments it may allow an improved user experience, and indeed, in many embodiments, it may allow reduced risk of unnecessary power transfer terminations while maintaining a very low risk of unacceptable heating of foreign objects. The user involvement required to improve a parasitic power loss or foreign object detection may be reduced in many embodiments. The invention may in particular in many scenarios allow an improved performance by an adaptation being user input dependent without this requiring the user to have any technical understanding of the underlying technical issues. Rather, a user may e.g. simply provide a simple binary input, such as answering yes or no to whether a foreign object is present.

The invention may specifically restrict an adaptation of the parasitic power loss detection operation to situations when there is a high probability that the parasitic power loss detection operation has generated an inappropriate result. Specifically, by performing the adaptation when the parasitic power loss estimate exceeds the range but no foreign object is present but not when the parasitic power loss estimate exceeds the range and a foreign object is present, the adaptation can proceed based on the assumption that an incorrect detection (e.g. a false detection) has occurred and accordingly the adaptation may reduce the probability of such a detection.

The parasitic power loss detection may trigger the generation of the user alert. The receiving of the user in response to the parasitic power loss detection may correspond to the parasitic power loss detecting triggering a time interval in which the user input can be received. The parasitic power loss detection and the receiving of a user input indicating that a foreign object is not present may trigger the adaptation whereas the parasitic power loss detection and the receiving of a user input indicating that a foreign object not present may not trigger the adaptation.

The parasitic power loss may be any power dissipated from the power signal, which is not dissipated by the power receiver.

The detection of the parasitic power loss may specifically be a detection that a parasitic power loss (e.g. estimated from transmit power and receive power estimates) exceeds a threshold (specifically the upper limit of the range). The parasitic power loss detector may thus generate a parasitic power loss detection if a determined parasitic power loss exceeds a threshold. This may for example be used to reduce sensitivity of the detection to result in fewer "false positives" where a parasitic power loss detection is generated to indicate that the parasitic power loss is too high, but there are no foreign objects present.

Alternatively or additionally, the detection of the parasitic power loss may specifically be a detection that a parasitic power loss (e.g. estimated from transmit power and receive power estimates) is below a threshold (specifically the lower limit of the range). The parasitic power loss detector may thus generate a parasitic power loss detection if a determined parasitic power loss falls below a threshold. This may for example be used to increase sensitivity of the detection to prevent missed detections where a parasitic power loss caused by a foreign object is not detected.

The adaptation of the parasitic power loss detection operation performed by the parasitic power loss detector to generate the parasitic power loss detection may specifically be an adaptation of a parasitic power loss detection algorithm used generate the parasitic power loss detection. The adaptation of the parasitic power loss detection operation performed by the parasitic power loss detector to generate the parasitic power loss detection may specifically be an adaptation of a parasitic power loss detection algorithm for detecting a parasitic power loss. The adaptation of a parasitic power loss detection operation performed by the parasitic power loss detector to generate the parasitic power loss detection may specifically be an adaptation/modification of a function for calculating the parasitic power loss estimate and/or an adaptation/modification of the range.

The adaptation may in response to the user input adapt a parasitic power loss detection operation performed by the parasitic power loss detector to detect parasitic power losses such that the detection probability is reduced. It may in response to the user input indicating that no foreign object is present change the parameter of the adapt a parasitic power loss detection operation generating the parasitic power loss detection such that the detection probability is reduced. Especially, the false detection probability is reduced. This may specifically be achieved by detecting the parasitic power loss estimate exceeding a threshold.

Alternatively or additionally, the adaptation may in response to the user input adapt a parasitic power loss detection operation performed by the parasitic power loss detector to detect parasitic power losses such that the detection probability is increased. It may in response to the user input indicating that no foreign object is present change the parameter of the adapt a parasitic power loss detection operation generating the parasitic power loss detection such that the detection probability is increased. Especially, the probability of missing a detection of an excessive power loss may be reduced. This may specifically be achieved by detecting the parasitic power loss estimate falling below a threshold.

The parameter may specifically be a parameter of a function, model or algorithm for calculating the parasitic power loss estimate and/or may be and end-point of the range (such as specifically an upper or lower threshold).

The parasitic power loss detector may be arranged to continuously during a power transfer phase perform a parasitic power loss detection algorithm. The adaptation may adapt the parasitic power loss detection algorithm for future power transfer.

A user input indicating that a foreign object not being present (and accordingly that parasitic power loss is likely not occurring), may indicate that the user considers the detection to be a false detection.

A user input indicative of a foreign object being present may be considered an indication that a significant parasitic power loss is occurring and that the user considers the detection to be a correct detection.

The controller may limit the power of the power signal if a user input meeting the false detection criterion is not received and/or if a user input indicating that a foreign object is not present is not received (e.g. within a given time interval). The controller may limit the power of the power signal by directly or indirectly controlling the power level of the power signal to be below a threshold. The threshold may be a predetermined threshold or in some embodiments may be a dynamically determined threshold, such as the threshold that will result in a parasitic power loss estimate being below a given threshold. In some embodiments, the controller may limit the power by terminating or not starting a power transfer, i.e. the controller may limit the power to a value of zero.

In some embodiments, the power of the power signal may be limited upon detection of the parasitic power loss exceeding a threshold and prior to receiving the user input. If a user input corresponding to a correct detection is received, the adaptation controller 213 may continue the already introduced limitation, e.g. by maintaining the reduced power level or preventing or abstaining from initializing a power transfer.

The adaptation may bias the parasitic power loss detection operation towards a reduced detection probability for the parasitic power loss estimate exceeding an upper value of the range. In particular, the adaptation may increase the requirement for a parasitic power loss exceeding the range to be detected. Thus, the adaptation may be such as to reduce the likelihood of detecting a parasitic power loss/a foreign object.

The adaptation may bias the parasitic power loss detection operation towards an increased detection probability for the parasitic power loss estimate being below a lower value of the range. In particular, the adaptation may reduce the requirement for a parasitic power loss exceeding the range to be detected. Thus, the adaptation may be such as to increase the likelihood of detecting a parasitic power loss/a foreign object.

The controller may e.g. determine that a user input indicating that a foreign object is present is received if an alternative user input is received or if no input is received within a required time interval.

The adaptation may be specific to the power receiver and power transmitter pairing.

In different embodiments, the functional entities may be distributed differently between the power transmitter, the power receiver, or indeed other entities.

For example, the parasitic power loss detector may e.g. be part of the power receiver, the power transmitter, or may be distributed between the power receiver and the power transmitter. Independently, the user indicator may e.g. be part of the power receiver, the power transmitter, or may be distributed between the power receiver and the power transmitter. Independently, the input may e.g. be part of the power receiver, the power transmitter, or may be distributed between the power receiver and the power transmitter. Independently, the controller may e.g. be part of the power receiver, the power transmitter, or may be distributed between the power receiver and the power transmitter.

In some embodiments, the range may only have an upper value and the parasitic power loss detection may be a detection of the parasitic power loss estimate exceeding a threshold/the upper value.

In some embodiments, the range may only have a lower value (typically equivalent to the upper value being infinite) and the parasitic power loss detection may be a detection of the parasitic power loss estimate being below a threshold/the lower value.

In some embodiments, the range may have both a lower value and an upper value, and the parasitic power loss detection may be a detection of either the parasitic power loss estimate being below a threshold/the lower value, or of the parasitic power loss estimate being above a different threshold/the upper value.

The controller may specifically be arranged to initiate an modification of a parameter of a parasitic power loss detection operation performed by the parasitic power loss detector to generate the parasitic power loss detection if the user input indicates an absence of a foreign object, and to not initiate the modification of the parameter of the parasitic power loss detection operation if the user input indicates an presence of a foreign object.

A user input indicating an absence of a foreign object may be considered equivalent/identical to a user input indicating that no foreign object is present.

In accordance with an optional feature of the invention, the parasitic power loss detector is arranged to generate the parasitic power loss detection if the parasitic power loss estimate has a value above an upper value of the range.

This may provide a particularly advantageous system, and may e.g. provide an advantageous adaptation to reduce the probability of false positives wherein a power loss is detected without any foreign object being present.

In accordance with an optional feature of the invention, the parasitic power loss detector is arranged to generate the parasitic power loss estimate from a power loss estimate model and to compare it to the range, and the wireless power transfer system the wireless power transfer system further comprises an adaptor for performing the adaptation, the adaptor being arranged to adapt at least one of a model for determining the parasitic power loss estimate and the range.

This may provide facilitated implementation while providing reliable operation.

The adaptation may specifically modify the model by modifying a determination of a transmit power estimate and/or a receive power estimate used to determine the parasitic power loss estimate. The adaptation may specifically be such as to bias the transmit power estimate and/or parasitic power loss estimate towards lower values and/or to bias the receive power estimate and/or the detection threshold towards higher values (specifically for detections of the parasitic power loss estimate exceeding an upper value of the range).

The adaptation may specifically be such as to bias the transmit power estimate and/or parasitic power loss estimate towards higher values and/or to bias the receive power estimate and/or the detection threshold towards lower values (specifically for detections of the parasitic power loss estimate being below a lower value of the range).

The adaptor may specifically be arranged to modify a function for determining/calculating the parasitic power loss estimate. The model for determining the parasitic power loss estimate may specifically be a function for determining the parasitic power loss estimate as a function of a set of input parameters. The adaptation may modify the function. The input parameters may include e.g. a receive power estimate, and/or a transmit power estimate.

In accordance with an optional feature of the invention, the input is at least partially comprised in the power receiver.

This may provide a more convenient user interaction in many embodiments and may e.g. exploit the fact that many power receivers have better user interfaces than do typical power transmitters.

In accordance with an optional feature of the invention, the parasitic power loss detector is at least partially comprised in the power transmitter.

This may facilitate implementation and/or operation in many embodiments. It may in many scenarios improve operation and ensure that the detection of e.g. foreign objects is by the entity generating the power signal.

In accordance with an optional feature of the invention, the parasitic power loss detector is at least partially comprised in the power receiver, and the power transmitter comprises a power estimator for generating a transmit power estimate for the power signal and a transmitter for transmitting the transmit power estimate to the power receiver, the power receiver comprises a receiver for receiving the transmit power estimate, and the parasitic power loss detector is arranged to generate the parasitic power loss detection based on the transmit power estimate.

This may allow a particularly advantageous distribution of functionality in many embodiments. In particular, it may allow the power transmitter to efficiently communicate relevant parameters for the parasitic power loss detection to a power receiver performing such detection.

The parasitic power loss detector may specifically determine a parasitic power loss estimate as a difference between the transmit power estimate and a locally generated receive power estimate.

In accordance with an aspect of the invention, there is provided apparatus for a wireless power transfer system including a power transmitter arranged to provide a power transfer to a power receiver via a wireless inductive power signal, the apparatus comprising: a parasitic power loss detector arranged to generate a parasitic power loss detection for the power transfer if a parasitic power loss estimate is outside a range; a user indicator for initializing a user alert in response to the parasitic power loss detection; an input for, in response to the parasitic power loss detection, receiving a user input indicating a presence of a foreign object or an absence of a foreign object; and a controller arranged to initiate an adaptation of a parasitic power loss detection operation performed by the parasitic power loss detector to generate the parasitic power loss detection if the user input indicates an absence of a foreign object, and to not initiate the adaptation of the parasitic power loss detection operation if the user input indicates a presence of a foreign object, the adaptation comprising a modification of a parameter of the parasitic power loss detection operation.

The approach may allow a highly reliable parasitic power loss/foreign object safeguard to be implemented by an apparatus. The apparatus may specifically be a device.

It will be appreciated that the comments provided with respect to the previously defined system applies mutatis mutandis to the apparatus.

In accordance with an optional feature of the invention, the apparatus further comprises an adaptor for performing the adaptation, the adaptor being arranged to set parameters for the power loss detection operation based on multiple initiated adaptations.

The approach may provide an improved operation and e.g. false object detection with typically fewer false detections and/or a reduced risk of missing a detection of a foreign object. The approach may in particular provide reduced sensitivity to variations in the positioning of the power receiver relative to the power transmitter. Indeed, in typical scenarios, the positioning of a device comprising a power receiver relative to the device comprising the powering power transmitter may vary somewhat from power transfer operation to power transfer operation. For example, a user positioning a mobile phone on a wireless charging platform will typically position it at slightly different positions and orientations each time. This will result in the relative position of the transmit coil and the receive coil varying between power operations and accordingly the coupling between the coils will vary. Also the impact of e.g. conductive parts (e.g. metal parts) of the power receiver device will vary. Therefore, calibrating (adapting) the parasitic power loss detection based on a specific measurement may result in a calibration that reflects a specific relative positioning which may indeed happen to be unusual or atypical. The approach of setting parameters based on multiple initiated adaptations may reduce the risk of the calibration reflecting less probable scenarios (i.e. outliers).

The parameter(s) which is (are) adapted may relate to a model or approach for determining the power loss estimate or may e.g. relate to the range used to assess whether the determined parasitic power loss estimate corresponds to a power loss detection or not.

The apparatus may thus repeatedly determine the parasitic power loss estimate and compare it to the range. If it exceeds the range (e.g. by being too high or too low), a power loss detection has occurred and if an appropriate user input is received, the adaptation process is initiated. This may happen multiple times, and the adaptation may be based on not only the current initiation but on multiple initiations. For example, the determination of the parameter(s) may include an averaging of at least one value, calculation, or parameter over a plurality of adaptation processes.

In accordance with an optional feature of the invention, the adaptor is arranged to adapt at least one of a model for determining the parasitic power loss estimate and the range based on multiple initiated adaptations.

This may provide improved performance and/or facilitate implementation and operation.

In accordance with an optional feature of the invention, the adaptor is arranged to modify at least one of the model for determining the parasitic power loss estimate and the range to bias a combined parasitic loss estimate for the multiple initiated adaptations towards a predetermined position in the range.

This may provide improved performance and/or facilitate implementation and/or operation. The adaptor may be arranged to modify a parameter of a model for determining the parasitic power loss estimate such that the resulting parasitic power loss estimate will be closer to the predetermined position (than if the modification had not been made). Alternatively or additionally, the adaptor may be arranged to modify one or both end points (i.e. the minimum value and/or the maximum value) of the range such that the combined parasitic power loss estimate of the multiple initiated adaptations will be closer to the predetermined position. The combined parasitic power loss estimate may specifically be a (possibly weighted) average of the parasitic power loss estimates for the different adaptations. As an example, the combined parasitic power loss estimate may be a parasitic power loss estimate resulting from (low pass) filtering the parasitic power loss estimate of the different adaptations.

As an example, a parasitic power loss estimate may be determined for N adaptations as a difference between a transmit power estimate and a receive power estimate. The parasitic power loss estimates may be averaged to provide a single averaged combined parasitic power loss estimate. This combined power loss estimate may be compared to the range and an offset may be introduced to the model for calculating the transmit power estimate and/or to the receive power estimate such that the combined parasitic power loss estimate for the N adaptations calculated using the modified (offset) power estimates are closer to the predetermined point. For example, an offset may be introduced to the determination of the transmit power estimate (or equivalently the receive power estimate) to result in an average of the calculated parasitic power loss estimate for the N iterations which is substantially equal to the midpoint of the range. As another example, the average parasitic power loss estimate for the N adaptations may be calculated, and the range end points may be determined relative to this combined parasitic power loss estimate, e.g. the averaged parasitic power loss estimate may be set at the midpoint of the range by the end points being given values that are symmetric around the calculated average parasitic power loss estimate.

In accordance with an optional feature of the invention, the adaptor is arranged to adapt at least one of a model for determining a power transmit estimate for a transmit power of the power transmitter, a model for determining a power receive estimate for the power receiver, and an end-point of the range.

This may provide improved and/or facilitated operation, performance and/or implementation. In particular, it may allow an efficient and low complexity adaptation in many embodiments and scenarios.

In accordance with an optional feature of the invention, the adaptor is arranged to set parameters for the power loss detection operation for individual pairings of a power transmitter and a power receiver.

This may provide improved performance in many embodiments and may allow a particularly accurate power loss detection in many scenarios. The parameters for a given pairing of a power transmitter and a power receiver may be determined in response to multiple adaptations initiated during power transfer from that power transmitter to that power receiver.

In accordance with an optional feature of the invention, the apparatus is the power transmitter and the adaptor is arranged to determine at least one parameter of the parameters for the power loss detection operation based on initiated adaptations for a plurality of power receivers.

This may provide improved performance in many embodiments and may allow a particularly accurate power loss detection in many scenarios. The parameters for a given power transmitter may be determined in response to multiple adaptations initiated during power transfer from that power transmitter to different power receivers. The approach may specifically allow the system to provide a more accurate compensation for variations in the power transmitter (e.g. due to component tolerances, measurement bias etc.). In this way, the approach may improve power loss detection accuracy for e.g. power transfer operations between the power transmitter and a power receiver that has not been used with the power transmitter before. In many scenarios, the probability that adaptation or calibration is necessary for new power receivers may be reduced in many scenarios.

The multiple adaptations for different power receivers may specifically be used to adapt the range or a model for determining a transmit power estimate.

In accordance with an optional feature of the invention, the apparatus is the power receiver and the adaptor is arranged to determine at least one parameter of the parameters for the power loss detection based on initiated adaptations for a plurality of power transmitters.

This may provide improved performance in many embodiments and may allow a particularly accurate power loss detection in many scenarios. The parameters for a given power receiver may be determined in response to multiple adaptations initiated during power transfer from different power transmitters. The approach may specifically allow the system to provide a more accurate compensation for variations in the power receiver (e.g. due to component tolerances, measurement bias etc.). In this way, the approach may improve power loss detection accuracy for e.g. power transfer operations between the power receiver and a power transmitter that has not been used with the power receiver before. In many scenarios, the probability that adaptation or calibration is necessary for new power transmitters may be reduced in many scenarios.

The multiple adaptations for different power transmitters may specifically be used to adapt the range or a model for determining a receive power estimate.

In accordance with an optional feature of the invention, the controller is arranged to initiate the adaptation only if the user input comprises an indication of a correct positioning of the power receiver for power transfer.

This may increase the probability that the adaptation reflects typical or desired usage scenarios.

In accordance with an optional feature of the invention, the apparatus is the power receiver.

The approach may allow a highly reliable parasitic power loss/foreign object safeguard to be implemented by a power receiver.

It will be appreciated that the comments provided with respect to the previously defined system applies mutatis mutandis to the power receiver.

In accordance with an optional feature of the invention, the parasitic power loss detector is arranged to generate the parasitic power loss detection based on a power loss indicator received from the power transmitter.

This may provide advantageous operation in many embodiments, and may specifically allow an improved distribution of functionality.

In some embodiments the power loss indicator may be indicative of a power difference between a transmit power estimate (indicative of a power of the power signal) and a receive power estimate indicative of a power extracted from the power signal by the power receiver.

In some embodiments, the power loss indicator may be indicative of the power transmitter detecting that a parasitic power loss estimate being outside the range.

In accordance with an optional feature of the invention, the parasitic power loss detector is arranged to generate the parasitic power loss detection in response to a lack of an acknowledgement for a message transmitted to the power transmitter by the power receiver.

This may provide advantageous operation and may in particular provide communication of the parasitic power loss detection by the power transmitter without requiring additional messaging and with a very low communication resource overhead.

The lack of an acknowledgement may be indicative of the power transmitter 101 detecting a parasitic power loss being outside the range.

In accordance with an optional feature of the invention, wherein the parasitic power loss detector is arranged to generate the parasitic power loss detection based on a comparison of a transmit power measure received from the power transmitter and a receive power estimate indicative of a power extracted from the power signal by the power receiver.

This may provide advantageous operation and implementation in many embodiments.

In accordance with an optional feature of the invention, the controller is arranged to transmit an adaptation request message to the power transmitter in response to a user input meeting the criterion being received.

This may allow the power receiver to control adaptation of the power transmitter. The adaptation request message may specifically be a calibration request message.

In some embodiments, the controller may be arranged to transmit at least one power down request to the power transmitter in response to a detection of a parasitic power loss.

This may allow the power receiver to control the power signal in case of a parasitic power loss detection.

The power down message may e.g. be a request to terminate power transfer, or may e.g. be a power control loop power down message.

For example, in some embodiments the at least one power down request comprises at least one power loop power down request.

In some embodiments, the controller is arranged to transmit power control loop power down requests to the power transmitter in response to a detection of a parasitic power loss meeting a first criterion until the parasitic power loss meets a second criterion.

In some embodiments, the apparatus may comprise an adapter for adapting at least one of a model for determining a parasitic power loss estimate and the range in response to not receiving a user input meeting the criterion.

In many embodiments, the adaptation is specific to the power receiver and power transmitter pairing.

In some embodiments, the power transmitter may be arranged to generate a user alert in response to receiving a user alert request from the power transmitter.

In accordance with an optional feature of the invention, the apparatus is the power transmitter.

The approach may allow a highly reliable parasitic power loss/foreign object precaution to be implemented by a power transmitter.

It will be appreciated that the comments provided with respect to the previously defined system applies mutatis mutandis to the power transmitter.

In some embodiments, the parasitic power loss detector may be arranged to detect the parasitic power loss in response to a comparison of a transmit power estimate (being indicative of a power of the power signal) and a receive power estimate received from the power receiver, the receive power estimate being indicative of a power extracted from the power signal by the power receiver.

In accordance with an optional feature of the invention, the user indicator is arranged to initialize the user alert by transmitting a user alert request message to the power receiver, the user alert request message requesting that the power receiver generates a user alert.

This may provide particularly advantageous operation in many embodiments.

In accordance with an optional feature of the invention, the input comprises a receiver for receiving an indication of the user input from the power receiver.

This may provide particularly advantageous operation in many embodiments.

In some embodiments, the indication of the user input may be a message comprising a request for adaptation/calibration (specifically if no user input meeting the criterion is received). The message may include a required calibration duration.

In accordance with an optional feature of the invention, the apparatus further comprises an adaptor for performing the adaptation, the adaptor being arranged to adapt at least one of a model for determining the parasitic power loss estimate and the range.

This may allow improved trade-off between complexity and reliability of operation in many embodiments.

In accordance with an optional feature of the invention, the power transmitter is arranged to transmit an indication of parasitic power loss detection to the power receiver in response to the detection of the parasitic power loss.

This may allow efficient and reliable operation in many embodiments.

In accordance with an optional feature of the invention, the power transmitter is arranged to transmit the indication of the parasitic power loss detection to the power receiver by withholding at least one acknowledge message for a message received from the power receiver.

This may allow efficient and reliable operation in many embodiments, and may in particular reduce the computational requirements.

According to an aspect of the invention there is provided a power transmitter for a wireless power transfer system, the power transmitter comprising: a power transfer unit arranged to provide a power transfer to a power receiver via a wireless inductive power signal, a parasitic power loss detector arranged to determine a parasitic power loss indicator for the power transfer; a transmitter for transmitting the parasitic power loss indicator to the power receiver.

This may provide a highly advantageous operation in many embodiments and may in particular allow an efficient support of parasitic power loss operations in the power receiver.

In accordance with an optional feature of the invention, the power loss indicator is indicative of a power difference between a power of the power signal and a receive power estimate indicative of a power extracted from the power signal by the power receiver.

In accordance with an optional feature of the invention, the parasitic power loss indicator is indicative of a transmit power estimate.

In accordance with an optional feature of the invention, the power loss indicator is indicative of a detection of the parasitic power loss meeting an excessive power loss criterion.

In accordance with an optional feature of the invention, the power transmitter is arranged to transmit the power loss indicator to the power receiver by withholding at least one acknowledge message for a message received from the power receiver.

According to an aspect of the invention there is provided a method of operation for a wireless power transfer system including a power transmitter arranged to provide a power transfer to a power receiver via a wireless inductive power signal, the method comprising: generating a parasitic power loss detection for the power transfer if a parasitic power loss estimate is outside a range; initializing a user alert in response to the parasitic power loss detection; receiving a user input in response to the parasitic power loss detection, the user input indicating a presence of a foreign object or an absence of a foreign object; and initiating an adaptation of a parasitic power loss detection algorithm to generate parasitic power losses if the user input indicates an absence of a foreign object, and not initiating the adaptation of the parasitic power loss detection operation if the user input indicates a presence of a foreign object, the adaptation comprising a modification of a parameter of the parasitic power loss detection operation.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
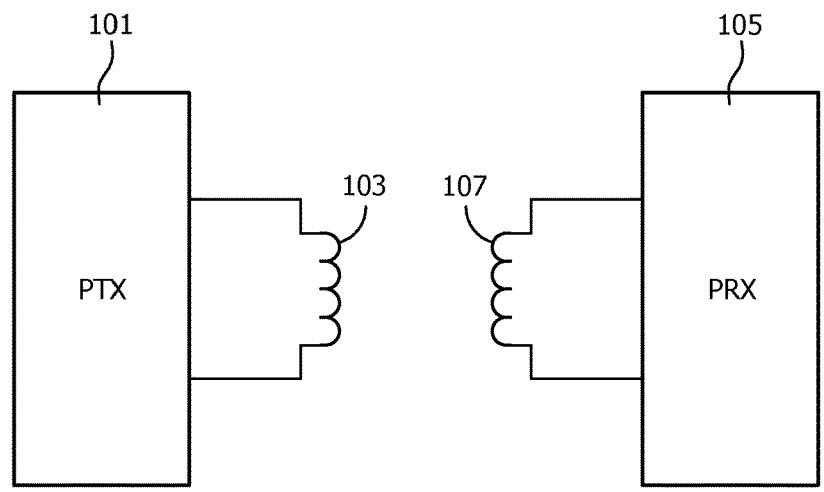
FIG. 1 illustrates an example of a power transfer system in accordance with some embodiments of the invention.

FIG. 1 illustrates an example of a power transfer system in accordance with some embodiments of the invention. The power transfer system comprises a power transmitter 101 which includes (or is coupled to) a transmitter coil/inductor 103. The system further comprises a power receiver 105 which includes (or is coupled to) a receiver coil/inductor 107.

The system provides a wireless inductive power transfer from the power transmitter 101 to the power receiver 105. Specifically, the power transmitter 101 generates a power signal, which is propagated as a magnetic flux by the transmitter coil 103. The power signal may typically have a frequency between around 100 kHz to 200 kHz. The transmitter coil 103 and the receiver coil 105 are loosely coupled and thus the receiver coil picks up (at least part of) the power signal from the power transmitter 101. Thus, the power is transferred from the power transmitter 101 to the power receiver 105 via a wireless inductive coupling from the transmitter coil 103 to the receiver coil 107. The term power signal is mainly used to refer to the inductive signal between the transmitter coil 103 and the receiver coil 107 (the magnetic flux signal), but it will be appreciated that by equivalence it may also be considered and used as a reference to the electrical signal provided to the transmitter coil 103, or indeed to the electrical signal of the receiver coil 107.

In the following, the operation of the power transmitter 101 and the power receiver 105 will be described with specific reference to an embodiment in accordance with the Qi standard (except for the herein described (or consequential) modifications and enhancements). In particular, the power transmitter 101 and the power receiver 103 may substantially be compatible with the Qi Specification version 1.0 or 1.1 (except for the herein described (or consequential) modifications and enhancements).

To prepare and control the power transfer between the power transmitter 101 and the power receiver 105 in the wireless power transfer system, the power receiver 105 communicates information to the power transmitter 101. Such communication has been standardized in the Qi Specification version 1.0 and 1.1.

On the physical level, the communication channel from the power receiver 105 to the power transmitter 101 is implemented by using the power signal as carrier. The power receiver 105 modulates the load of the receiver coil 105. This results in corresponding variations in the power signal at the power transmitter side. The load modulation may be detected by a change in the amplitude and/or phase of the transmitter coil 105 current, or alternatively or additional by a change in the voltage of the transmitter coil 105. Based on this principle, the power receiver 105 can modulate data which the power transmitter 101 demodulates. This data is formatted in bytes and packets. More information can be found in the "System description, Wireless power Transfer, Volume I: Low Power, Part 1: Interface Definition, Version 1.0 July 2010, published by the Wireless power Consortium" available via http://www.wirelesspowerconsortium.com/downloads/wireless-power-specification-part-1.html, also called the Qi wireless power specification, in particular chapter 6: Communications Interface.

To control the power transfer, the system may proceed via different phases, in particular a selection phase, a ping phase, identification and configuration phase, and a power transfer phase. More information can be found in chapter 5 of part 1 of the Qi wireless power specification.

Initially, the power transmitter 101 is in the selection phase wherein it merely monitors for the potential presence of a power receiver. The power transmitter 101 may use a variety of methods for this purpose, e.g. as described in the Qi wireless power specification. If such a potential presence is detected, the power transmitter 101 enters the ping phase wherein a power signal is temporarily generated. The power receiver 105 can apply the received signal to power up its electronics. After receiving the power signal, the power receiver 105 communicates an initial packet to the power transmitter 101. Specifically, a signal strength packet indicating the degree of coupling between power transmitter and power receiver is transmitted. More information can be found in chapter 6.3.1 of part 1 of the Qi wireless power specification. Thus, in the Ping phase it is determined whether a power receiver 105 is present at the interface of the power transmitter 101.

Upon receiving the signal strength message, the power transmitter 101 moves into the Identification & Configuration phase. In this phase, the power receiver 105 keeps its output load disconnected and communicates to the power transmitter 101 using load modulation. The power transmitter provides a power signal of constant amplitude, frequency and phase for this purpose (with the exception of the change caused by load-modulation). The messages are used by the power transmitter 101 to configure itself as requested by the power receiver 105.

Following the Identification and Configuration phase, the system moves on to the power transfer phase where the actual power transfer takes place. Specifically, after having communicated its power requirement, the power receiver 105 connects the output load and supplies it with the received power. The power receiver 105 monitors the output load and measures the control error between the actual value and the desired value of a certain operating point. It communicates such control errors to the power transmitter 101 at a minimum rate of e.g. every 250 ms to indicate these errors to the power transmitter 101 as well as the desire for a change, or no change, of the power signal.

The power transfer operation is based on a wireless magnetic flux power signal being generated by the power transmitter 101 and being captured by the power receiver 105. Thus, the power signal induces a voltage and current in the receive coil 107. However, the power signal will also induce currents in any other conductive material including e.g. metallic parts of the power receiver 105 or the power transmitter 101. Furthermore, if other objects, known as foreign objects, are positioned sufficiently close to the transmit coil 103, substantial currents may be induced in conductive parts of such objects. For example, substantial eddy currents may be induced which may result in heating of the object. If too much power is induced in the foreign object, this may heat up substantially. Thus, in addition to the undesirable power loss, the induced power in foreign objects may also result in undesirable, and perhaps even almost unsafe situations. As an example, a user may inadvertently put a set of keys next to a mobile phone being charged by a power transmitter. This may result in the set of keys heating substantially and potentially even sufficiently to cause the keys to burn the user when picking up the keys. The problem is exacerbated for higher powers, and has become more critical for e.g. the Qi power transfer approach when this is being expanded to higher power levels.

In order to address such risks, the Qi standard includes functionality for detecting such scenarios and terminating power transfer in response to the detection. Specifically, the power transmitter 101 may estimate the parasitic power loss (i.e. the difference between the power provided to the power signal by the power transmitter 101 and that consumed by the power receiver 105). If this exceeds a given level, it is considered likely to be due to a foreign object being present and accordingly the power transmitter 101 proceeds to terminate power transfer. Thus, the power transmitter 101 includes a foreign object detection function.

In the Qi power transfer standard, the power receiver estimates its received power e.g. by measuring the rectified voltage and current, multiplying them and adding an estimate of the internal power losses in the power receiver (e.g. losses of the rectifier, the receive coil, metal parts being part of the receiver etc.). The power receiver reports the determined received power to the power transmitter with a minimum rate of e.g. every four seconds.

The power transmitter estimates its transmitted power, e.g. by measuring the DC input voltage and current of the inverter, multiplying them and correcting the result by subtracting an estimation of the internal power losses in the transmitter, such as e.g. estimated power loss in the inverter, the primary coil and metal parts that are part of the power transmitter.

The power transmitter 101 can estimate the power loss by subtracting the reported received power from the transmitted power. If the resulting parasitic power loss estimate exceeds a detection threshold, the power transmitter 101 will assume that too much power is dissipated in a foreign object and it can then proceed to terminate the power transfer.

Specifically, the power transfer is terminated when the parasitic power loss estimate PT−PR is larger than a threshold where PT is the transmit power estimate and PR is the receive power estimate.

The measurements may be synchronized between the power receiver and the power transmitter. In order to achieve this, the power receiver can communicate the parameters of a time-window to the power transmitter during configuration. This time window indicates the period in which the power receiver determines the average of the received power. The time window is defined relative to a reference time, which is the time when the first bit of a received power packet is communicated from power receiver to power transmitter. The configuration parameters for this time window consist of a duration of the window and a start time relative to the reference time.

When performing this power loss detection, it is important that the power loss is determined with sufficient accuracy to ensure that the presence of a foreign object is detected.

Firstly, it must be ensured that a foreign object that absorbs significant power from the magnetic field is detected. In order to ensure this, any error in estimating the power loss calculated from the transmitted and received power must be less than the acceptable level for power absorption in a foreign object. Similarly, in order to avoid false detections, the accuracy of the power loss calculation must be sufficiently accurate not to result in estimated power loss values that are too high when no foreign object is present.

It is substantially more difficult to determine the transmitted and received power estimates sufficiently accurately at higher power levels than for lower power levels. For example, assuming that an uncertainty of the estimates of the transmitted and received power is ±3%, this can lead to an error of ±150 mW at 5 W transmitted and received power, and
±1.5 W at 50 W transmitted and received power.

Thus, whereas such accuracy may be acceptable for a low power transfer operation it is not acceptable for a high power transfer operation.

Typically, it is required that the power transmitter must be able to detect power consumption of foreign objects of only 350 mW or even lower. This requires very accurate estimation of the received power and the transmitted power. This is particularly difficult at high power levels, and frequently it is difficult for power receivers to generate estimates that are sufficiently accurate. However, if the power receiver overestimates the received power, this can result in power consumption by foreign objects not being detected. Conversely, if the power receiver underestimates the received power, this may lead to false detections where the power transmitter terminates the power transfer despite no foreign objects being present.

Thus, simply overestimating the received power—which would result in a perceived power loss that is too low—is not acceptable, due to the increased likelihood that foreign objects will not be detected (false negatives). Underestimating the received power would result in a positive perceived power loss, and is not acceptable as this would lead to detections indicating that a foreign object is present despite there not being any (a false positive). Therefore, only a narrow band is available for any uncertainty in the estimates.

Obviously, the occurrence of numerous false positives is detrimental to the popularity of the power transfer system and Standard. For example, the average consumer will not understand why their devices are not being charged, or e.g. why their devices charge flawlessly on one power transmitter, but refuse to charge on another. However, false negatives may potentially be even more disadvantageous as it could as a worst case result in foreign objects being heated to a degree where they may cause significant problems.

In order to address this issue and to provide a more accurate foreign object detection, it has been proposed that the power transmitter and the power receiver are calibrated to each other such that the specific characteristics of the individual power receiver and power transmitter are reflected in the foreign object detection. An example of this is provided in European patent application EP12 188 672.5, which discloses a system wherein power transfer is allowed only for low power levels between a power transmitter and power receiver pairing that has not been previously calibrated with each other. However, if the user performs a calibration of the power transmitter and power receiver pairing resulting in a more accurate foreign object detection, the system allows power transfers at higher power levels.

However, whereas such an approach may provide desirable operation in many embodiments, it may be suboptimal in some scenarios. Indeed, the approach requires that calibration must be performed for all power transmitter and power receiver pairings before higher power level power transfers can be performed, even if such calibration is not necessary. For example, for many power receiver and power transmitter combinations, the resulting transmit power and receiver power estimates may be very accurate resulting in a sufficiently reliable foreign object detection even at higher power levels and without any calibration. Calibrations are often inconvenient to a user and often require manual inputs and dedicated calibration modes.

However, the system of FIG. 1 uses a different approach that allows a selective adaptation of the system to the specific characteristics. Indeed, rather than always requiring a calibration to be performed for the power transmitter and power receiver combination, the system allows for the power transfer to go ahead while monitoring estimates of the parasitic power loss and detecting whether this is too high. If such a power loss is detected, the system alerts the user (and potentially powers down) and requests the user to provide an input of whether a foreign object is present or not. If the indication is that a foreign object is indeed present, it proceeds to limit the power of the power signal to a safe level (e.g. requiring the parasitic power loss to be below a safe threshold). However, if the user indicates that no foreign object is present, the system may proceed with the power transfer at the higher power level. In addition, it proceeds to initiate an adaptation of the detection of the parasitic power loss. The adaption is such that the likelihood of parasitic power loss detections is reduced, i.e. the parasitic power loss detector is less likely to detect a parasitic power loss (e.g. by increasing the detection threshold for an estimated parasitic power loss to be considered unacceptable).

Thus, in the approach, the user interaction is limited to scenarios wherein a potential problem does occur. Furthermore, the approach allows the system to be adapted towards a more accurate detection that may reduce the false detection probability.

Furthermore, only a very simply interaction with the user is required. Indeed, the user is asked whether a foreign object is present or not, and can simply respond with a binary user input simply indicating whether he considers there to be a foreign object or not. Indeed, a simple yes/no input may be provided by the user. The user can e.g. simply press a button indicating that there is a foreign object or not. The approach accordingly allows the system to adapt and calibrate itself to be more accurate. The calibration is based on the user input but it does not require the user to have any understanding of how the foreign object detection is performed, which parameters are involved etc. Indeed, the user does not even need to know or understand that the user input is used for calibration of a foreign object detection. In contrast to approaches wherein a user may e.g. directly control or set parameters of the foreign object detection operation, the current approach requires no technical understanding by the user and accordingly allows the system to be widely applied in the consumer market place.

The approach seeks to adapt the parasitic power loss detection operation which is performed to generate a parasitic power loss detection. Thus, the approach is directed to how the algorithm/approach for detecting a parasitic power loss can be adapted. The adaptation specifically comprises a modifying a parameter of the detecting algorithm for generating the parasitic power loss detection.

The approach ties modifications of the parasitic power loss detection operation for generating the parasitic power loss detection (the detection algorithm) to actual detections of parasitic power losses and to a simple user input.

Indeed, in the approach, a modification of the detection algorithm is triggered by a parasitic power loss detection generated by the detection algorithm itself. The event of a detection of a parasitic power loss thus triggers the initialization of an adaptation which modifies a parameter of the detection algorithm that has generated the detection. In addition, the triggering of the adaptation by the detection is made conditional on a user input. The user input provides an indication of whether there is indeed a foreign object present or not. Only in the latter case is the adaptation allowed to go ahead.

Thus, a specific approach for triggering an adaptation of the detection algorithm is provided. Specifically, the adaptation may in many embodiments only be initialized/triggered as a consequence of a parasitic power loss detection occurring despite there (according to the user input) being no foreign object present. The modification of the detection algorithm may accordingly specifically be triggered in response to a false detection and the modification may e.g. take this fact into account.

The adaptation of the detection algorithm is performed when a very specific set of circumstances arise, namely when a parasitic power loss estimate is outside a range and a user input is received indicating that there is no foreign object present. The adaptation is accordingly only triggered when a specific set of events occur. Namely, the detection algorithm is modified as a consequence of a parasitic power loss being detected and a user input being received indicating that there is no foreign object present. This may specifically correspond to a "false trigger".

The triggering of the adaptation in a very specific scenario allows improved adaptation of the detection performance. Specifically, it allows the system to adapt the algorithm by detecting when there is a high likelihood of an undesired performance of the detection algorithm, such as specifically a high likelihood of a false detection having occurred, i.e. it may effectively detect that the algorithm has made an error and then proceed to adapt the algorithm to reduce the chance of this happening again.

Indeed, a particular advantage of the system is that as long as the algorithm does not make mistakes (corresponding to the parasitic power loss estimate being within the range when there is no foreign object present), the adaptation may not be triggered. Thus, when the system is functioning as expected, no adaptations are triggered thereby reducing complexity, resource demand, and even more importantly preventing that the system is changed from the current optimal settings/performance.

The specific adaptation which is employed will depend on the specific preferences and requirements of the individual embodiment and application. Indeed, the advantages provided by performing the adaptation in a very specific situation is not limited to a specific adaptation or adaptation approach. Different possible exemplary adaptations will be described in the following but many other implementations are possible and may be employed without subtracting from the invention. The choice of adaptation approach is an implementation decision which depends on the specific application scenario.

The approach allows for a much improved user experience. Indeed, rather than always requiring a user interaction or input in order to calibrate or setup the detection algorithm, the approach may restrict the required user interaction to only occur when a parasitic power loss is actually detected. This is likely to occur quite rarely and therefore the user will only be inconvenienced rarely, and indeed typically only if the parasitic power loss detection algorithm generates an erroneous detection. Furthermore, the approach may allow the detection algorithm to be initialized with nominal parameters and then subsequently adapt itself if these parameters are not suitable or generates too many false detection.

In addition, the user is only required to provide a simple binary input indicating whether there is a foreign object present or not. This not only requires minimum interaction from the user but is also a very easy input to provide by the user. No technical knowledge or understanding is required by the user, whether of the adaptation process, the parasitic power loss detection algorithm, or indeed of the wireless power transfer system as such. In fact, the user does not even need to be aware that the input is used in connection with the parasitic power loss detection operation. In contrast to many previous approaches, which focus on preventive measures that typically require user assistance before high power transfer is enabled, the system of FIG. 1 focuses on corrective measures which seek to detect a potential problem, and then address the problem if it does indeed occur. This may substantially decrease the required user interaction and may in many scenarios allow high power level transfers without requiring any previous user activity.

For example, high level power transfer may be initiated on request of the power receiver as defined in the Qi standard. The power transfer may proceed with the system checking the estimated parasitic power loss. If an unacceptable parasitic power loss is detected, the system may terminate the power transfer and request that the user indicates whether indeed a foreign object is present or not. If so, the system terminates the power transfer. If not, the system proceeds to perform an adaptation to reflect that a false detection occurred. Specifically, it may initiate a (potentially manual or semi-manual) calibration of the power transmitter 101 and power receiver 105.

Thus, in the example, a user input is requested only if the power transmitter 101 and/or the power receiver 105 detect a perceived potentially unsafe situation. If the user indicates that there is no abnormal situation, (e.g. there is no foreign object on the power transmitter surface), full power transfer continues. The power transmitter 101 and/or power receiver 105 can use the user input to recalibrate their estimates. If the user does not provide an input within a certain amount of time, the power transfer is either terminated, or continued at a lower level, such that the perceived unsafe situation is resolved. Thus, in this example, the absence of a user input is considered equivalent to a user input indicating that a foreign object is present.

Finally, the user could also indicate that there indeed was an unsafe situation, but that he has taken measures to resolve the issue (e.g. he has removed foreign objects from the power transmitter surface), and that full power transfer can be continued safely.

The approach may thus in many scenarios and embodiments provide an improved user experience, e.g. with a reduced requirement for manual user calibrations, while still providing reliable e.g. foreign object detection functionality. Only a simple user interaction is employed and there is no requirement for any technical understanding by the user.

Figure 2:
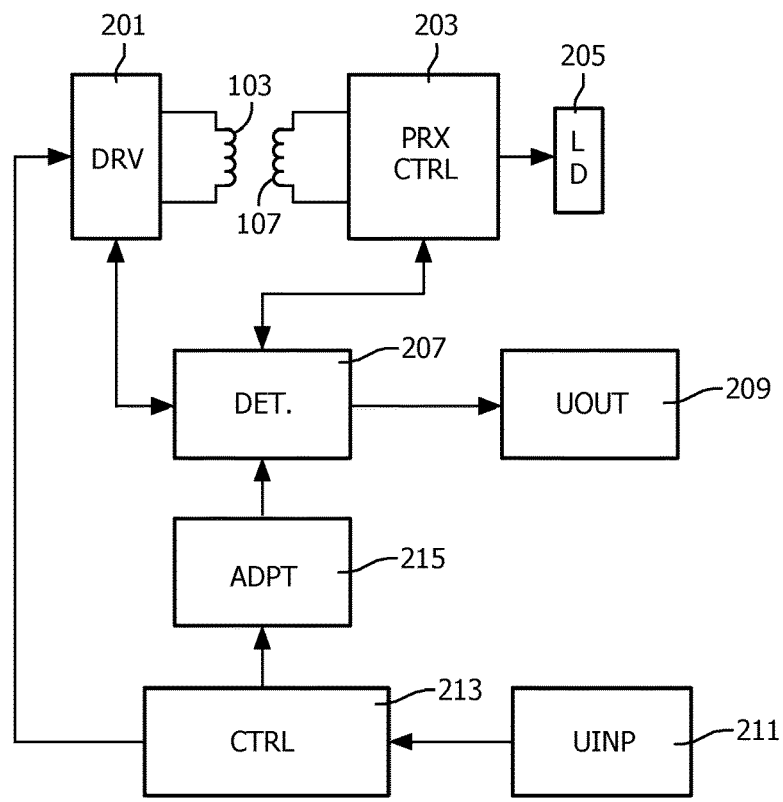
FIG. 2 illustrates an example of a power transfer system in accordance with some embodiments of the invention.

FIG. 2 illustrates the system FIG. 1 in more detail. Specifically FIG. 2 illustrates various functional elements associated with the foreign object/parasitic power loss detection and operation.

FIG. 2 illustrates a driver 201 which is coupled to the transmit coil 103 and which generates the power signal and provides this to the transmit coil 103. Thus, during power transfer, the driver 201 provides the power signal to the power receiver via the transmit coil 103 (and the receive coil 107).

Figure 3:
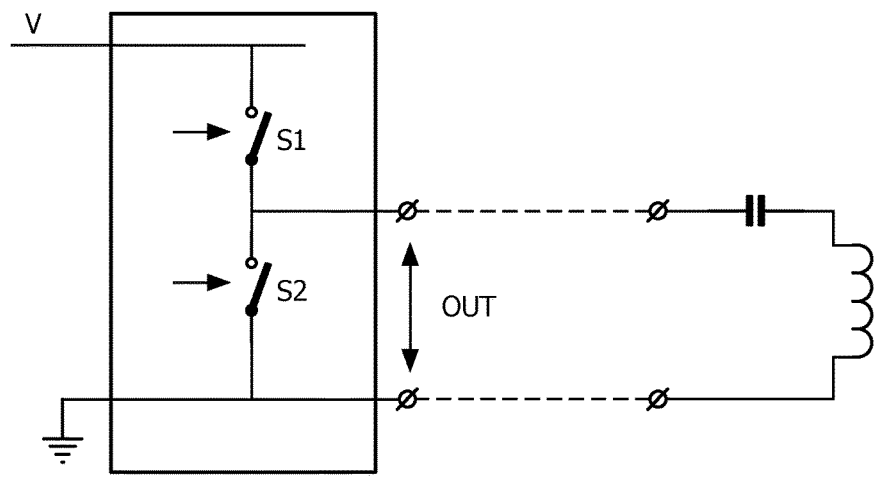
FIG. 3 illustrates an example of elements of a half-bridge inverter for a power transmitter in accordance with some embodiments of the invention.
Figure 4:
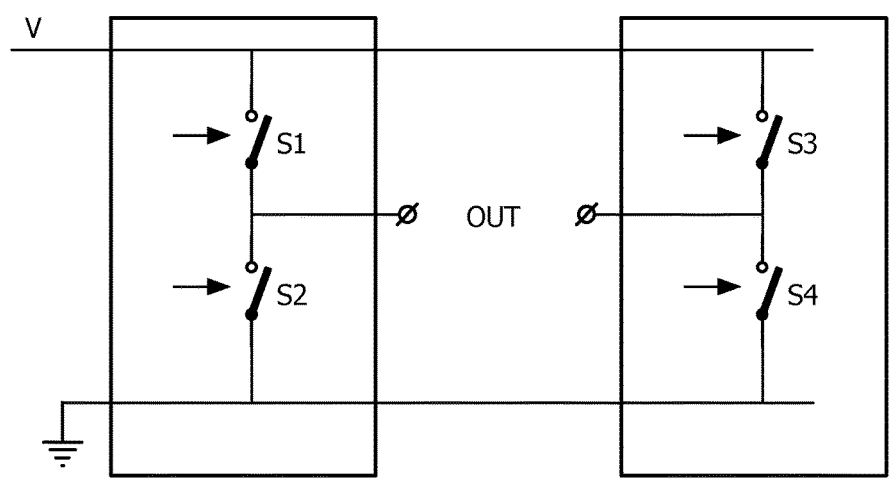
FIG. 4 illustrates an example of elements of a full-bridge inverter for a power transmitter in accordance with some embodiments of the invention.

The driver 201 thus generates the current and voltage which is fed to the transmitter coil 103. The driver 201 is typically a drive circuit in the form of an inverter which generates an alternating signal from a DC Voltage. FIG. 3 shows a half-bridge inverter. The switches S1 and S2 are controlled such that they are never closed at the same time. Alternatingly S1 is closed while S2 is open and S2 is closed while S1 is open. The switches are opened and closed with the desired frequency, thereby generating an alternating signal at the output. Typically the output of the inverter is connected to the transmitter coil via a resonance capacitor. FIG. 4 shows a full-bridge inverter. The switches S1 and S2 are controlled such that they are never closed at the same time. The switches S3 and S4 are controlled such that they are never closed at the same time. Alternatingly switches S1 and S4 are closed while S2 and S3 are open, and then S2 and S3 are closed while S1 and S4 or open, thereby creating a block-wave signal at the output. The switches are open and closed with the desired frequency.

The driver 201 also comprises control functionality for operating the power transfer function and may specifically comprise a controller arranged to operate the power transmitter 101 in accordance with the Qi standard. For example, the controller may be arranged to perform the Identification and Configuration as well as the power transfer phases of the Qi standard.

The receiver coil 107 is coupled to a power receiver controller 203, which comprises various functionality for operating the power transfer function, and is in the specific example arranged to operate the power receiver 105 in accordance with the Qi standard. For example, the power receiver 105 may be arranged to perform the Identification and Configuration as well as the power transfer phases of the Qi standard.

The power receiver controller 203 is arranged to receive the power signal and to extract the power during the power transfer phase. The power receiver controller 203 is coupled to a power load 205 which is the load powered from the power transmitter 101 during the power transfer phase. The power load 205 may be an external power load but is often part of the power receiver device, such as a battery, display or other functionality of the power receiver (e.g. for a smart phone the power load may correspond to the combined functionality of the smart phone).

The system further comprises a parasitic power loss detector 207, which is arranged to generate a parasitic power loss detection for the power transfer in response to a parasitic power loss estimate being outside a range. Specifically, the parasitic power loss detector 207 may generate a power loss estimate indicative of a power difference between a transmit power estimate for the power transmitter 101 and a receive power estimate for the power receiver 105 and to detect if the difference between these fall outside a range.

For example, the parasitic power loss detector 207 may consider a transmit power estimate generated by the power transmitter 101.

As a simple example, the transmit power estimate may be determined as the power which is fed to the transmitter coil 103 or may e.g. be determined as the input power to the inverter stage of the driver 201. For example, the power transmitter 101 may measure the current through the transmitter coil 103, the voltage over the transmitter coil 103 and the phase difference between the voltage and current. It can then determine the corresponding (time averaged) power based on these values. As another example, the supply voltage of the inverter is typically constant, and the power transmitter 101 may measure the current drawn by the inverter and multiply this by the constant voltage to determine the input power to the inverter. This power may be used as the transmit power estimate.

In many embodiments, a slightly more complex transmit power estimate is generated. In particular, the approach may compensate the calculated power for losses in the power transmitter 101 itself. In particular, losses in the transmitter coil 103 itself may be calculated, and the input power may be compensated by this value to provide an improved indication of the power, which is transmitted from the transmitter coil 103.

The power loss in the transmitter coil 103 may be calculated as:

$$P_{losscoil} = R \cdot I_{coil}^2$$

where $I_{coil}$ is the rms current through the transmitter coil 103 and R is the equivalent resistance of the transmitter coil 103. Assuming the resistance is known, the transmitted power may be estimated by:

$$P_{tx} = V_{coil} \cdot I_{coil} \cdot \cos(\varphi) - R \cdot I_{coil}^2$$

where $V_{coil}$ is the voltage over the transmitter coil 103 and $\Phi$ is the phase between $V_{coil}$ and $I_{coil}$.

R may depend on the frequency of the transmitter coil current, e.g. according to a function such as: $R = R_b + R_f \cdot f$, where $R_b$ is the frequency independent part of the equivalent resistance, $R_f$ is the frequency dependent part of the equivalent resistance, and f is the frequency.

Further, the parasitic power loss detector 207 may consider a receive power estimate generated by the power receiver 105.

The receive power estimate may directly be estimated as the power that is provided to the load of the power receiver 105. However, in many embodiments, the power receiver 105 will generate a receive power estimate which also includes power loss/dissipation in the power receiver 105 itself. Thus, the reported received power indication may include both power provided to the load as well as power loss in the power receiver 105. For example, it may include measured or estimated power loss in the rectification circuits and/or the receiver coil. In many embodiments, the receive power estimate may also include estimates of power dissipated in e.g. conductive parts of the power receiver enclosure.

Typically time averaged values are used, e.g. with the power values being determined as average values in suitable time intervals, with the time intervals preferably being synchronized between the power transmitter 101 and the power receiver 105.

The parasitic power loss detector 207 may subtract the receive power estimate from the transmit power estimate to determine the parasitic power loss estimate. The parasitic power loss estimate is an estimate of the amount of power that is not dissipated or consumed by the power receiver 105 (including the power provided to the load 205. Thus, the parasitic power loss estimate can be considered to be an estimate of power that is consumed by other devices than the power receiver 105 (or the power transmitter 101). Thus the parasitic power loss estimate is an estimate of losses that may occur in other entities, such as foreign objects positioned near the transmit coil 103. The parasitic power loss estimate may specifically be a foreign object estimate.

The parasitic power loss detector 207 is arranged to generate a parasitic power loss by evaluating if the parasitic power loss estimate meets a parasitic power loss criterion corresponding to the parasitic power loss estimate being outside a range. In many embodiments, the criterion may be that the parasitic power loss estimate exceeds a given detection threshold which may be a predetermined threshold. Accordingly, in some embodiments, the parasitic power loss detector 207 may simply compare the difference between the transmit power estimate and the receive power estimate to a given threshold and indicate that a parasitic power loss has been detected if the threshold is exceeded. This may indicate that the loss in a foreign object may be too high and that there is a potential risk of an unwanted heating of a foreign object.

The following description will focus on embodiments wherein the range only has an upper limit, i.e. where the parasitic power loss detection is a detection which reflects that the parasitic power loss estimate exceeds a given threshold. However, as will be described later, in some embodiments, the range may also, or only, have a lower limit. Thus, in such embodiments, it may be detected that the parasitic power loss estimate is below a threshold, and this may be an indication that the sensitivity of the parasitic power loss detection is too low and should be increased.

In the scenario where a parasitic power loss detection reflects a determination that the parasitic power loss estimate exceeds a threshold, the system may reduce the transmitted power instantly if a parasitic power loss is detected, and may e.g. terminate the power transfer or reduce this to a power level that is considered to result in an acceptable parasitic power loss value. However, in addition, the system proceeds to further evaluate whether the parasitic power loss detection was a genuine detection or was a false positive. In some embodiments, the power transfer may be continued at the original power level during this evaluation, but in most embodiments it will be preferred that the power level is reduced or that the power transfer is completely suspended during the evaluation.

The evaluation of whether the detection is a correct or genuine detection is performed by involving the user.

Accordingly, the system comprises a user indicator unit 209 which is coupled to the parasitic power loss detector 207 and which is arranged to initialize a user alert in response to the detection of the parasitic power loss. Thus, when the parasitic power loss detector 207 detects a parasitic power loss, a control signal is fed to the user indicator unit 209, which then proceeds to generate a user alert. The user alert may for example be by visual means (e.g. a flashing or colored light), auditory means (e.g. a beeping or buzzing sound), and/or by a more elaborate textual or graphic user interface.

The system further comprises an input unit 211, which is capable of receiving user inputs. The user input may e.g. be provided by the user pressing a dedicated button, by providing or not providing an input within a given time, or by more complex means such as providing a touch input on a suitable touch sensitive screen which e.g. may also provide the user alert.

The user alert provides a request to the user to provide a user input indicating a presence of a foreign object or an absence of a foreign object. Thus, when the user alert is generated, this indicates to the user that he must provide a simple user input which indicates whether there is a foreign object present or not. The user is thus informed of the potential foreign object detection and is requested to provide a binary user input indicating whether there is actually a foreign object present or not.

The input unit 211 is accordingly arranged to receive a user input which indicates a presence of a foreign object or an absence of foreign object; i.e. it indicates whether there is a foreign object present or not (in the opinion of the user). Only a simple binary input needs to be provided by the user.

In the embodiment, the foreign object detection accordingly starts a process of not only alerting the user to the detection, but also of requesting and monitoring for a user input indicating whether indeed a foreign object is present or not.

The generation of the user alert and the system receiving a user input are consequently closely correlated. Specifically, the generating of the user alert and the receiving of the user input occurs as a direct result of the foreign object detection. It is the fact that a foreign object detection has occurred which results in both the user alert being generated, and in a user input being received by the input unit 211. The user alert is furthermore a direct indication of the foreign object detection happening. Similarly, the input unit 211 is arranged to receive the user input indicting whether the foreign object is present or not as a direct consequence of the foreign object detection event. As a result, the user input provided is not merely a generic user input that in principle could be applied at other times, or even before the foreign object detection, but rather is a user input which is specifically correlated to the foreign object detection event that has just occurred. As a consequence, the input as to whether there is indeed a foreign object present or not, provides a very strong indication of whether the foreign object detection was indeed a correct detection or whether it was a false positive detection.

In some embodiments, the input unit 211 may be arranged to initiate a time interval for receiving the user input in response to the foreign object detection. Thus, specifically, when the parasitic power loss detector 207 generates a parasitic power loss detection, this event sets a timer in which a user input can be provided to the input unit 211, where the user input is indicative of whether there is a foreign object present or not. This approach may ensure that the user input is closely correlated to the actual detection event and thus can ensure that the indication with very high probability reflects the situation during the parasitic power loss detection.

In many embodiments, the input unit 211 may be arranged to set the user input to indicate that a foreign object is present unless an input corresponding to an indication that no foreign object has been received prior to the end of the interval. Thus, the default position is to consider the test correct and to consider there to indeed be a foreign object present unless the user has explicitly indicated that no such foreign object is present. This may result in a more reliable and safer approach in many scenarios.

For example, if the parasitic power loss detector 207 detects a foreign object, it may cause a warning light to flash, e.g. highlighting a message indicating that the user should press a button if no foreign object is present. If the user proceeds to press the button, this corresponds to a user input that is indicative of there being no foreign object present. If the user does not press the button within e.g. a predetermined interval, this indicates that there is indeed a foreign object present. The input unit 211 is coupled to an adaptation controller 213, which receives the user input provided to the input unit 211. The adaptation controller 213 is arranged to evaluate whether a user input is received that meets a false detection criterion or not, i.e. the adaptation controller 213 may evaluate if the user input is received which meets a criterion corresponding to a user input being received that is indicative of the parasitic power loss detection being a false detection. The false detection indication may typically correspond to the user indicating that there is no foreign object present. Thus, in response to the user alert, the user may proceed to provide an input which indicates whether a foreign object is present near the transmit coil 103 or not. If the input indicates that there is no foreign object and that the detection was a false detection, the false detection criterion is met. If the input indicates that there is indeed a foreign object and that the detection is a correct detection, the false detection threshold is not met. If no user input is received indicating a correct or false detection, the false detection criterion is not met, i.e. in the absence of a relevant user activation, the detection is typically considered correct.

The adaptation controller 213 is capable of controlling the operation of the power transmitter 101 and specifically is capable of controlling the power signal and the power transfer.

If the adaptation controller 213 does receive a user input which does not meet the given user input criterion corresponding to an indication of the detection being a false detection; i.e. if a user input is received which indicates that there are no foreign objects, then the adaptation controller 213 will consider the detection to be a correct detection, i.e. it will consider that the parasitic power loss is indeed too high and may potentially be due to excessive power dissipation in a foreign object. Accordingly, it will proceed to control the power transmitter 101 to operate in a mode wherein the power of the power signal is restricted to a safe level.

In some embodiments, the power transfer may continue even if the detection is considered correct but with the adaptation controller 213 controlling the power transmitter 101 such that the power of the power signal is limited to a value wherein the parasitic power loss is sufficiently low to be considered acceptable even if dissipated in a foreign object. The limit may in some embodiments be a predetermined limit, such as a power level that can safely be assumed to not result in excessive heating. In other embodiments, the limitation of the power of the power signal may depend on the actual operating conditions and estimates. For example, the adaptation controller 213 may reduce the power until the parasitic power loss estimate is reduced to an acceptable level. In some embodiments, the limitation may be that no power signal provided, i.e. the power transfer may be terminated completely (e.g. the limit may be substantially zero).

If the user indicates that the detection is a false detection, i.e. a user input is received which indicates that there are no foreign object present, the adaptation controller 213 will proceed to perform an adaption/calibration of the detection algorithm for detecting a parasitic power loss. Specifically, the adaptation controller 213 may initiate an adaptation of the approach for determining the parasitic power loss estimate and/or the criterion for determining whether this is acceptable or not. The adaptation includes modifying at least one parameter of the parasitic power loss detection operation, such as specifically modifying at least one of a parameter of a model for calculating the parasitic power loss estimate and of an end-point of the range (in which the parasitic power loss estimate is considered acceptable).

Thus, when the user input indicates that no foreign object is present, and thus that the detection is a false detection, the adaptation controller 213 proceeds to adapt/modify the detection process to reduce the likelihood of such false detections. For example, the threshold for the parasitic power loss estimate may be increased.

The adaptation/calibration is thus an adaptation of the detection process and results in a changed detection performance. In particular, the adaptation may be one that reduces the number of false detections, i.e. the probability of foreign object detections are reduced following the adaptation. Thus, the adaptation is of a parameter of the parasitic power loss detection operation and specifically includes a change of the parameter resulting in a modified power dissipation element performance/probability.

It should be noted that such an adaptation of a parameter of a parasitic power loss detection operation results in a change in the detection performance. Thus, it changes the detection algorithm resulting in the parasitic power loss detector 207 being more or less sensitive. Thus, the adaptation will increase or decrease the probability of detection. This adaptation of the parasitic power loss detection operation is thus independent of the actual reaction of the system to a parasitic power loss detection, i.e. whether the system proceeds with the power transfer operation, terminates the power transfer operation etc. Thus, the adaptation of the parasitic power loss detection operation is an adaptation of the operation that generates the parasitic power loss detection, i.e. it is an adaptation of the detection algorithm, and is independent and separate from how the system reacts to a given parasitic power loss detection, e.g. whether it proceeds with the power transfer or not.

Thus, the adaptation includes a modification of a parameter of the parasitic power loss detection operation that generates the parasitic power loss detection, and this modification results in a change in the future detection performance. Thus, a parasitic power loss detection event may not only result in a reaction in the power transfer operation of the system (e.g. the power transfer may be terminated or reduced) but may in addition result in the actual algorithm for detecting parasitic power losses being modified for future detections. how the detection is performed and will result first inverse partial function.

Accordingly, the adaptation controller 213 is arranged to modify the parameter of a parasitic power loss detection operation such that detection performance is changed. This adaptation is typically independent of any response of the system to the parasitic power loss detection that affects the actual power transfer operation. Indeed, it will be appreciated that in some embodiments, some adaptation of the systems response to a parasitic power loss detection may additionally be performed without detracting from the current invention.

In the specific system described, the wireless power transfer may proceed to provide power or not dependent on whether a user input is received that is indicative of there being a foreign object present or not. In addition, the adaptation controller 213 is also arranged to perform a modification of the actual detection algorithm depending on whether a user input is received that is indicative of there being a foreign object present or not. The two aspects are both the result of the parasitic power loss detection and the user input but may be considered independent. Specifically, only the modification of the detection algorithm may be performed in some systems, and e.g. the termination of a power transfer may e.g. always be the result of a parasitic power loss detection without any consideration of any user input.

In the case where the user indicates that the detection is a false detection, the adaptation controller 213 may specifically proceed to control the power transmitter 101 to proceed with the power transfer as before the detection. For example, in scenarios where the power transfer is continued during the evaluation, the power transmitter 101 may simply continue the power transfer without interruption. In scenarios, where the power transfer is terminated or suspended during the evaluation, the adaptation controller 213 may cause the power transfer to be restarted or resume upon the receipt of a positive user input indicative of a false detection. In both scenarios, the system may proceed to modify a parameter of the parasitic power loss detection operation/algorithm.

In some embodiments, the adaptation controller 213 may not restart or resume a power transfer automatically but may require a manual restart, e.g. by requiring the user to remove the power receiver 105 from the power transmitter 101, and to subsequently put the power receiver 105 back on the power transmitter 101 to start a new power transfer. Such an approach may for example have the advantage that it requires the user to temporarily remove the power receiver 105 thereby making it easier to detect foreign objects that may have been hidden by the power receiver 105.

In many embodiments, the parasitic power loss detection is performed by determining a parasitic power loss estimate and comparing this to a detection threshold as previously described. In the example of FIG. 2, the adaptation controller 213 is coupled to the driver 201 and can control this in response to the user input, e.g. by limiting power, terminating the power threshold, or indeed restarting or resuming power transfer (if the user input indicates that it is a false detection). In addition, the adaptation controller 213 is coupled to an adaptation unit 215 which may perform the adaptation by modifying the generation of the parasitic power loss estimate, the detection threshold or both. Thus, specifically, it may modify a parameter of the function or algorithm for calculating the parasitic power loss estimate and/or may modify the detection threshold.

For example, the adaptation unit 215 may be arranged to increase the detection threshold, when the user indicates that no foreign objects are present. Thus, after a false detection has occurred, the adaptation unit 215 may increase the detection threshold that the parasitic power loss estimate must exceed for there to be considered to be a parasitic power loss detection. In this way, the system will adapt the operation to reduce the likelihood of a false detection. Thus, the system will introduce a(n) additional bias away from detecting a parasitic power loss. Thus, the actual detection probability will change.

In some embodiments, the threshold may e.g. be changed by a fixed predetermined amount. In other embodiments, the amount of adaptation may be dependent on the specific operating characteristics, such as e.g. dependent on the degree to which the parasitic power loss estimate exceeds the previous threshold.

Thus, if the parasitic power loss detector 207 generates a number of false detections, the system will adapt its operation by increasing the requirement for false detections and thereby reduce the number of false detections. The process may e.g. be repeated until an acceptable frequency of false detections occurs.

In some embodiments, the system may e.g. be initiated with the detection threshold set at a relatively low level, and indeed to a level, which is expected to be too low. In such embodiments, the system will adapt to the appropriate detection threshold by this gradually being increased for each false detection until a reasonable frequency of the false detections is achieved.

In some embodiments, the adaptation may alternatively or additionally be by an adaptation of the model (e.g. functions/equations) used to determine the parasitic power loss estimate. Thus, the adaptation controller 213 may in such embodiments modify a function or algorithm for calculating the parasitic power loss estimate. Specifically, when user input is received that indicates that there is no foreign object present, the adaptation controller 213 proceeds to modify a parameter of a model providing the parasitic power loss estimate. Accordingly, the adaptation controller 213 will modify the operation such that the same measured input values will result in a different generated parasitic power loss estimate after the modification/adaptation than would be the case before the modification.

For example, in some embodiments, the adaptation unit 215 may be arranged to modify the approach for determining the transmit power estimate. Specifically, it may modify a parameter of a function or algorithm which calculates the transmit power estimate. E.g. when a false detection is detected, an offset to the transmit power estimate may be introduced (or increased) that reduces the power estimate. For example, for each false detection, a compensation factor or offset to the calculation of the transmit power estimate may be added or modified. Such a compensation may thus adapt the calculated transmit power estimate for future compensations such that the estimated transmit power will be reduced. This reduction may for example reflect measurement bias in determining the voltage or current provided to the transmit coil 103, bias errors in the original model for determining the transmit power estimate, or impact of unaccounted for power dissipation in the power transmitter 101 itself, whether as part of the generation of the power signal (e.g. resistive losses in the transmit coil 103) or as losses incurred by induction in elements of the power transmitter 101 itself (e.g. in metal parts of the device containing the power transmitter 101).

In some embodiments, the adaptation unit 215 may thus bias/modify the transmit power estimate towards lower values. Such a modification will reduce the probability of a foreign object detection.

In other embodiments, the adaptation unit 215 may be arranged to modify the approach for determining the receive power estimate. Specifically, it may modify a parameter of a function or algorithm which calculates the receive power estimate. E.g. when a false detection is detected, an offset to the receive power estimate may be introduced (or increased) that increase the power estimate. For example, for each false detection, a compensation factor or offset to the calculation of the receive power estimate may be added or modified. Such a compensation may thus adapt the calculated receive power estimate for future compensations such that the estimated receive power will be increased. This increase may for example reflect measurement bias in calculating the received voltage or current of the receive coil 107, bias errors in the original model for determining the receive power estimate, or impact of unaccounted for power dissipation in the power receiver 105 itself, whether as part of the extraction of power from the power signal (e.g. resistive losses in the receive coil 107) or losses incurred by induction in elements of the power receiver 105 itself (e.g. in metal parts of the device containing the power transmitter 101).

In some embodiments, the adaptation unit 215 may thus bias/modify the receive power estimate towards higher values.

In some embodiments, the adaptation unit 215 may bias/modify the parasitic power loss estimate towards lower values.

In some embodiments, the adaptation unit 215 may bias/bias the detection threshold towards higher values.

In some embodiments, only one of the transmit power estimate and the receive power estimate may be adapted/modified whereas in other embodiments both the transmit power estimate and the receive power estimate may be adapted/modified. Similarly, in some embodiments only one the parasitic power loss estimate and the detection threshold may be adapted whereas in other embodiments, both may be adapted.

In some embodiments, the detection threshold (i.e. the upper value of the range) may be set to zero, and the adaptation may bias the parasitic power loss estimate (e.g. by biasing the transmit power estimate or the receive power estimate).

For example, there may be a requirement that a power receiver may not underestimate the received power level. Therefore, to introduce a margin for uncertainty, the power receiver will typically overestimate the received power. In combination with a power transmitter that does not underestimate its transmitted power, the resulting parasitic power loss estimate is normally negative. A positive parasitic power loss estimate may therefore be considered an indication of the presence of a foreign object.

The approach addresses the issue that if a power receiver would be allowed to underestimate its received power, the power transmitter has to include this potential underestimation in its threshold. The threshold would in this case depend on the uncertainty of the power receiver. The possible uncertainty may be different for different versions of the standard, and therefore could require the power transmitter to use different thresholds for different versions.

In many embodiments, the adaptation controller 213 may be arranged to initialize a calibration of the power transmitter 101 and the power receiver 105 pairing. For example, a suitable offset for the parasitic power loss estimate may be determined and stored for a range of different power levels.

As the user has confirmed that no other objects are present, this calibration may be performed under the assumption that only the power receiver 105 and the power transmitter 101 are present. As a specific example, the assumption may lead to a consideration that the parasitic power loss estimate should be zero in this case, and thus the parasitic power loss detector 207 may determine a parasitic power loss estimate for a given power level. If the parasitic power loss estimate is different from zero, a compensation offset corresponding to the calculated parasitic power loss estimate may be stored for the power level. This may be repeated for a range of power levels resulting in a set of compensation factors being stored for the pairing of this power transmitter 101 and power receiver 105.

The detection algorithm applied by the parasitic power loss detector 207 during normal power transfer may subsequently apply this compensation factor. Specifically, for a given power signal value, the parasitic power loss detector 207 may retrieve the compensation factor stored for the nearest power level (or may interpolate between different values). It may then proceed to apply this offset when calculating the parasitic power loss estimate. In the ideal case, the parasitic power loss estimate will accordingly be zero unless a foreign object is present.

The adaptation introduced to the parasitic power loss detection may in many embodiments be specific to the power transmitter 101 and power receiver 105 combination, i.e. the adapted detection algorithm may be applied to power transfers between the specific power transmitter 101 and power receiver 105 but not to other pairings. Thus, individual adaptations to the specific devices can be used. Thus may provide more reliable and accurate detection performance in many embodiments.

The system of FIG. 2 describes an example of the operation of functionality for detecting parasitic power losses such as those typically associated with foreign objects positioned close to the transmit coil 103. The approach allows for an adaption and modification of the detection of the parasitic power loss such that in particular the number of false detections can be reduced without unacceptably increasing the risk of missing a detection of a foreign object. The approach is very user friendly and may in particular provide an approach wherein power transfer may be pursued even at higher power levels without requiring previous calibration and manual user intervention. Rather, the approach may reduce the user input requirement to specific situations where false detections occur. Furthermore, only a simple yes/no answer to the question of whether there are any other objects present in the vicinity is required. The approach does not require any technical understanding of the user. Thus, a much easier and more practical user experience may be achieved, and specifically an approach suitable for the consumer market can be achieved.

The functionality described with reference to FIG. 2 may be distributed differently between the power transmitter 101 and the power receiver 105 in different embodiments (and some functionality could even be implemented in a third entity). Indeed, most of the functions may in some embodiments be part of the power transmitter 101, in other embodiments be part of the power receiver 105, and in yet other embodiments be distributed across both the power transmitter 101 and the power receiver 105.

For example, the parasitic power loss detector 207 may be implemented in the power transmitter 101, the power receiver 105 or distributed across these. Similarly, the user indicator unit 209 may be implemented in the power transmitter 101, the power receiver 105 or distributed across these, and the input unit 211 may be implemented in the power transmitter 101, the power receiver 105 or distributed across these. In some embodiments, the adaptation controller 213 may be comprised in the power transmitter 101, in others in the power receiver 105, and yet again in others it may be distributed across the power receiver 105 and power transmitter 101. Indeed, even the adaptation unit 215 may in some embodiments be in the power transmitter 101, in others it may be in the power receiver 105, and yet again in other embodiments it may be distributed across the power receiver 105 and power transmitter 101.

In many embodiments, the functionality may advantageously be comprised in the power transmitter 101. An example of such a power transmitter 101 is illustrated in FIG. 5 in which the same functions as in FIG. 2 are denoted by the same reference signs.

Figure 5:
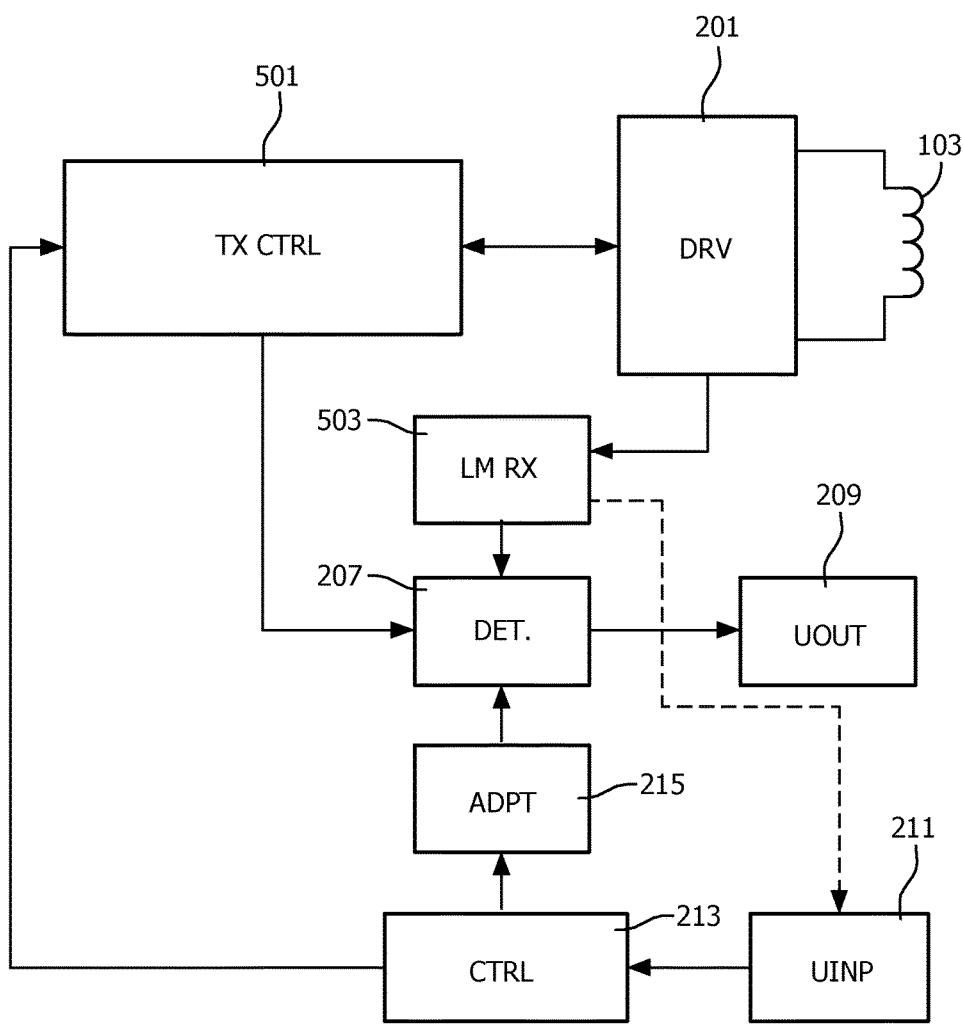
FIG. 5 illustrates an example of a power transmitter in accordance with some embodiments of the invention.

The power transmitter 101 of FIG. 5 includes a transmit controller 501 which controls the operation of the power transmitter 101 including operating it in accordance with the Qi standards when appropriate. The transmit controller 501 is coupled to the driver 201 and is arranged to control this to provide the desired power signal, including a power signal with the desired power level. The transmit controller 501 also receives measured data, such as coil current and voltage from the driver 201.

The transmit controller 501 is furthermore coupled to the parasitic power loss detector 207 which in the example generates a parasitic power loss estimate as a difference between a transmit power estimate and a receive power estimate.

In the example, the transmit power estimate is generated by the parasitic power loss detector 207 based on the measurements of the coil current and voltage. The transmit power estimate may specifically be generated based on locally available measurements and using a suitable model for the transmit power estimate, such as e.g. previously described.

In the example, the receive power estimate is not calculated by the power transmitter 101 but rather is generated as a receive power estimate transmitted to the power transmitter 101 from the power receiver 105. Accordingly, the power transmitter 101 of FIG. 5 comprises a load modulation receiver 503, which is arranged to receive data messages from the power receiver 105. The data messages may specifically be modulated onto the power signal by load modulation as known from e.g. the Qi Standard. Indeed, the received power values required to be generated by the power receiver 105 and transmitted to the power transmitter 101 may be used directly as the receive power estimates.

Specifically, in power transfer systems such as the Qi standard, the power receiver 105 is required to communicate received power values to the power transmitter 101. The received power values are indicative of the power that is received by the power receiver 105.

In some embodiments, the power receiver 105 may report a received power value, which corresponds directly to the power that is provided to the load of the power receiver 105. However, in many embodiments, the power receiver 105 will generate a received power value that also includes power loss/dissipation in the power receiver 105 itself. Thus the reported received power indication may include both power provided to the load as well as power loss in the power receiver 105 itself. For example, it may include measured or estimated power loss in the rectification circuits and/or the receiver coil.

In many embodiments, the received power indication may be provided directly as a power value. However, it will be appreciated that in other embodiments other indications may be provided, such as a current and/or voltage. For example, in some embodiments, the received power indication may be provided as the current or voltage induced in the receive coil 107. In such scenarios, the parasitic power loss detector 207 may calculate the receive power estimate based on the received values.

The parasitic power loss detector 207 may accordingly generate the parasitic power loss estimate and compare it to a detection threshold. If the threshold is exceeded, the user indicator unit 209 generates a user alert, for example by sounding an audio alert, flashing a light etc.

Furthermore, if the threshold is exceeded, the input unit 211 is arranged to monitor for an input from a user indicating whether there is a foreign object present or not. Thus, the threshold being exceeded corresponds to a foreign object detection, and when this event happens, a user alert is generated and a user input is received.

As a specific example, the parasitic power loss detector 207 may in response to a parasitic power loss detection generate a trigger signal which is fed to the input unit 211 and the user indicator 209. In response to receiving the trigger signal, the user indicator (209) proceeds to generate the user alert. In addition, in response to the trigger signal, the input unit 211 proceeds to monitor for a user input. For example, in response to receiving the trigger signal the input unit 211 may start a timer, e.g. having a duration of between 5 seconds and two minutes, in which the user input may be received. If a user activation corresponding to an indication of there is no foreign object present is received within that time interval, a user input indicating that there are no foreign objects present has been received. If a user activation is detected that indicates that there is indeed a foreign object present, or if no user activation is detected before the timer expires, the system proceeds and considers that a user input has been received which is indicative of there being a foreign object present.

The input unit 211 may comprise a physical user input means, such as buttons, that the user can activate in response to the user alert. For example, if the user presses a first button this may indicate that there are no foreign objects present, and if the user presses a second button (or omits pressing the first button) this may indicate that a foreign object is (was) indeed present.

The means for providing the physical user alert and for receiving the physical user input are in the specific example part of the power transmitter 101. For example, they may include lights and buttons on the front of the enclosure of the power transmitter 101.

Depending on the user input, the adaptation controller 213 then proceeds to initiate an adaptation of the parasitic power loss detection. In the example, the adaptation may typically be a modification/change of a parameter for a function for calculating the transmit power estimate, the parasitic power loss estimate as a whole, the receive power estimate. It may specifically be a modification of a function for calculating the parasitic power loss estimate from the received receive power estimate (e.g. by introducing an offset). In many embodiments, the adaptation controller 213 may proceed to initialize a full calibration of the power transmitter 101 and power receiver 105 pairing.

Also, the adaptation controller 213 is coupled to the transmit controller 501 and can provide a control input to this in order to allow the adaptation controller 213 to additionally control the operation of the power transmitter 101. Specifically, the adaptation controller 213 can control the transmit controller 501 to terminate power transfer, reduce the power level of the power signal, restart or resume power transfer etc. as appropriate. Specifically, if a user input is received indicating that a foreign object is detected, the adaptation controller 213 may control the transmit controller 501 to limit power until the foreign object has been removed (as e.g. indicated by the power receiver 105 being removed from the power transmitter 101 and subsequently put back to start a new power transfer operation).

As a specific example of an embodiment where the functionality is predominantly in the power transmitter, the power transmitter 101 may proceed with an ongoing power transfer. However, if the power transmitter perceives that power transfer might be unsafe by detecting a parasitic power loss estimate being above a threshold (which might indicate that a foreign object is being heated), it alerts the user, e.g. by visual means (a flashing or colored light), auditory means (a beeping or buzzing sound), or a more elaborate textual or graphical user interface. If the user responds within a predetermined time, e.g. by pressing a (physical or virtual) button to indicate that there is no unsafe situation, the power transmitter permits power transfer to proceed. Otherwise, the power transmitter either terminates the power transfer, or reduces its transmitted power until the power loss drops below the threshold level. If the user has informed the power transmitter that there is no unsafe situation, the power transmitter may update the threshold for this particular power receiver, based on the power loss that was detected and the user input. Alternatively or additionally, the power transmitter may update its model for estimating its transmitted power—again for this particular power receiver. An advantage of such updating is that the next time the user places this power receiver on the power transmitter, it is (much) less likely that the power transmitter will have to request user assistance. The power transmitter may after detecting a potentially unsafe situation, require the user to remove the power receiver and place it back before allowing the user to indicate that there is no unsafe situation (e.g. by pressing a button). This increases the possibility that the user spots a foreign object that could be hidden between power transmitter and the power receiver.

An approach wherein the functionality is predominantly in the power transmitter 101 may be advantageous in many embodiments. For example, it is compatible with the general design philosophy and approach of e.g. the Qi standard where it is desired to have as much of the functionality and intelligence in the power transmitter 101 as possible. It may also allow for simplified interfacing, reduced communication requirements, and low complexity power receivers.

However, in other embodiments, it may be advantageous for some of the functionality to be comprised in the power receiver 105. For example, the physical interface to the user may in some embodiments advantageously be provided by the power receiver 105. For example, if the power receiver 105 is (part of) a smartphone, this may already comprise advanced user interface functionality (display and touch screen) which can be exploited by the current approach. Such an approach may also allow the user interaction to feel more convenient to the user, as the user interacts with the system using a user interface and user interface device with which he is familiar. In such an approach, there is no requirement for the user to interface with the specific power transmitter that is currently used to charge his device.

In some embodiments, the means for providing the user alert may at least partially be comprised in the power receiver, or equivalently means of the power transmitter 101 for generating the user input may generate the user input by transmitting a user alert request message to the power receiver 105. The user alert request message provides a request that the power receiver generates a user alert.

When the power receiver 105 receives such a message, it may accordingly proceed to generate the user alert. For example, when the power receiver 105 receives the message, it may accordingly proceed to generate a user alert, for example by displaying a warning on a display and sounding an alarm. E.g., if the power receiver 105 is part of a smartphone, the display of the smartphone may start flashing a warning message while the speaker emits a warning sound.

The user alert request message may specifically be a parasitic power loss detection message, which indicates that a parasitic power loss has been detected by the parasitic power loss detector 207. The user alert may request a user input indicating a presence of a foreign object or an absence of foreign object. Thus, specifically, the user indicator unit 209 may be arranged to transmit an indication of a detection of a parasitic power loss to the power receiver 105 when this is detected by the parasitic power loss detector 207. The indication can specifically be transmitted as a user alert request message, although it will be appreciated that any communication from the power transmitter 101 to the power receiver 105 indicating that a parasitic power loss detection has occurred can be considered to be a user alert request message.

In the system, the power receiver 105 may accordingly generate a user alert in response to receiving a user alert request message from the transmitter.

In many embodiments, it may further be advantageous for the user input to be provided via the power receiver 105. This may be independent of whether the user alert is generated by the power transmitter 101 or the power receiver 105 (or both).

In some embodiments, the power transmitter 101 may comprise functionality for receiving the user input from the power receiver 105, and specifically the input unit 211 may comprise a receiver which can receive an indication of the user input from the power receiver 105, and the power transmitter 101 may comprise a transmitter for transmitting the indication.

In some such embodiments, the power receiver 105 may comprise a user interface that can receive the user input, such as for example a touch screen that the user can manually interact with to provide a desired input. The power receiver 105 may further comprise a transmitter, which can transmit data messages to the power transmitter 101. The transmitter may specifically comprise a load modulator, and thus the user input may be a transmitter using load modulation e.g. allowing the load modulation receiver 503 to be reused for receiving such user input messages.

In such embodiments, if the user confirms to the power receiver 105 that there is no foreign object present, or that any foreign objects have been removed, the power receiver 105 may proceed to transmit a message to the power transmitter 101 to indicate that according to the user there is no foreign object present, and that the power transmitter should adapt the generation of the parasitic power loss estimate or the detection threshold. Specifically, such an indication can be considered to be a request for an adaptation, and specifically for a (re)calibration of the power transmitter 101 and power receiver 105 pairing. It will be appreciated that any suitable calibration approach may be used. Examples may for example be found in European patent application EP12 188 672.5.

Such approaches may for example exploit the fact that a typical power receiver—e.g. a mobile phone—has much richer user interface possibilities than the typical power transmitter. It is therefore often advantageous if the power receiver can inform the user of a perceived unsafe situation, rather than the power transmitter. This is especially true for power transmitters that are (almost) invisibly integrated into tables, desktops, nightstands or other kinds of furniture. However, in the specific approach this requires the power transmitter to be able to inform the power receiver of the existence of a potentially unsafe situation. However, in accordance with e.g. the current Qi standard, only the power transmitter has access to sufficient data to accurately estimate the power loss across the interface, i.e. to generate the parasitic power loss estimate.

Therefore, it is desirable for the system to be able to communicate the indication of the parasitic power loss efficiently from the power transmitter 101 to the power receiver 105.

In some embodiments, this may be achieved by the introduction of a dedicated data packet which when received by the power receiver 105 indicates that the power transmitter 101 has detected a parasitic power loss. The power receiver 105 may accordingly proceed to generate a user alert and/or receive a user input.

In some embodiments, a particularly efficient communication may be achieved by modifying the operation and significance of some other messages. Specifically, in some embodiments, the power transmitter 101 may be arranged to transmit an indication of the occurrence of a parasitic power loss detection to the power receiver by using a different code for the response message or by withholding at least one response message for a message received from the power receiver.

For example, the power transmitter 101 may normally reply/respond to a message from the power receiver 105 by transmitting an acknowledge message to the power receiver 105 indicating that the message have been received. In some embodiments, the power transmitter 101 may actively transmit a non-acknowledge message or may suppress a response message if a parasitic power loss detection has occurred. The power receiver 105 may monitor for an acknowledge message and if this is not received (or e.g. a non-acknowledge message is received), it may proceed to consider that this may be due to the original message not having been received by the power transmitter 101, or that alternatively the absence of the acknowledge message/the non-acknowledge message may indicate that the power transmitter 101 has detected a parasitic power loss situation. The power receiver 105 may accordingly proceed to retransmit the message and monitor for an acknowledge message to this retransmission. If an acknowledge message is received, the power receiver 105 may proceed without taking any further action. However, if no acknowledge message is received, it may proceed to initiate a user alert and request a user input. When a user input is received, it may proceed to generate a data message feeding the response back to the power transmitter 101.

The approach may be particularly advantageous in embodiments where the bandwidth for the communication from the power transmitter 101 to the power receiver 105 is significantly limited. For example, in many embodiments the power transmitter to power receiver communication may be limited to a single bit for a message, such as a bit providing an acknowledgement after receiving a message from a power receiver. In such an approach, the power receiver 105 may at regular intervals send messages to the power transmitter 101 indicating the received power, (e.g. the receive power estimate generated by the power receiver 105). If the power receiver receives an acknowledge from the power transmitter in response to a transmission of such a received power packet, the power receiver can interpret such acknowledgement as an indication that the power transmitter does not perceive an unsafe situation (i.e. there has not been a parasitic power loss detection). In that case, the power receiver 105 can continue to request full power. On the other hand, if the power receiver receives a non-acknowledge message (or does not receive any message) in response to a receive power message, the power receiver 105 can interpret this as a perceived unsafe situation being detected by the power transmitter (i.e. a parasitic power loss detection). It should than inform the user of this fact, and ask the user if there is a foreign object present on the surface of the power transmitter, and if so, that the user should remove such foreign object. If the power receiver receives neither an acknowledge nor a non-acknowledge indication in response to a received power message, the power receiver should treat such absence of a response of the power transmitter in the same fashion as a non-acknowledge, or quickly resend a received power packet to re-enforce a response.

In embodiments where the physical user input is provided to the power receiver 105, the power receiver 105 may transmit an indication of this user input to the power transmitter 101, which may then proceed based on this indication as previously described. In order to support such communication, a new message may be introduced, which specifically may be a dedicated message.

In some embodiments, the power receiver 105 may transmit the indication in a form of a message that comprises a request for calibration from the power receiver 105. The request for calibration may include an indication of the duration in which the power transmitter 101 should remain in a calibration mode.

Specifically, if the user indicates that no foreign object is present, the message should inform the power transmitter 101 of this, and request that the power transmitter should (re-)calibrate at least one aspect of the detection (e.g. the detection threshold or the parasitic power loss estimate (e.g. by adapting the transmit power estimate)).

A specific example of such a data message/packet, which is suitable for Qi based system, may be a message/packet that is used to request the power transmitter to enter a calibration mode in which it calibrates its parameters or algorithm for foreign object detection for this specific power receiver. The request for calibration accordingly indicates that the user has confirmed to the power receiver that no foreign object is near the active area of the transmit coil 103. During the calibration mode, the power receiver preferably supports the power transmitter by e.g. entering various load conditions and/or by entering a load condition at which power transfer is at maximum and by communicating its received power at least once for each of these conditions.

A specific message/packet suitable for a Qi based approach may be a Foreign Object Detection (FOD) calibration packet having a header of 0x08 and given by the following structure:

| $b_7$ | $b_6$ | $b_5$ | $b_4$ | $b_3$ | $b_2$ | $b_1$ | $b_0$ |
|---|---|---|---|---|---|---|---|
| $B_0$ | | | Request FOD calibration | | | | | where the eight bit unsigned integer value Request FOD calibration may represent one of the following:

Request FOD Calibration:

The unsigned integer value indicates the duration of the calibration mode expressed in seconds starting from the end of communication of the FOD calibration packet.

In the above described examples, the detection of the parasitic power loss was performed in the power transmitter 101 based on values available in the power transmitter 101, and specifically based on the locally generated transmit power estimate and the received receive power estimate.

In other embodiments, the detection may be performed in the power receiver 105. For example, the power receiver 105 may comprise the parasitic power loss detector 207 (or at least part of it) and may accordingly generate a parasitic power loss estimate and compare it to a detection threshold. If a parasitic power loss detection occurs, the power receiver 105 may proceed to generate a user alert and receive a user input. Furthermore, depending on the user input, the system may proceed with the power transfer or may proceed to terminate the power transfer, e.g. by transmitting a power transfer termination message to the power transmitter 101. The power transmitter 101 may in response to such a power transfer termination message proceed to end the power transfer phase, and may specifically remove the power signal. Thus, by transmitting the power transfer termination message the power receiver 105 achieves a limitation of the power of the power signal (to substantially zero).

Furthermore, when receiving a user input indicting that no foreign objects are present, the power receiver 105 may initiate an adaptation of the detection approach for detecting the parasitic power loss, such as e.g. an adaptation of the determination of the parasitic power loss estimate or of the detection threshold. Thus, in this situation, the adaptation will modify a parameter of the parasitic power loss detection algorithm, and specifically may change a function for calculating the parasitic power loss estimate or a detection threshold.

Figure 6:
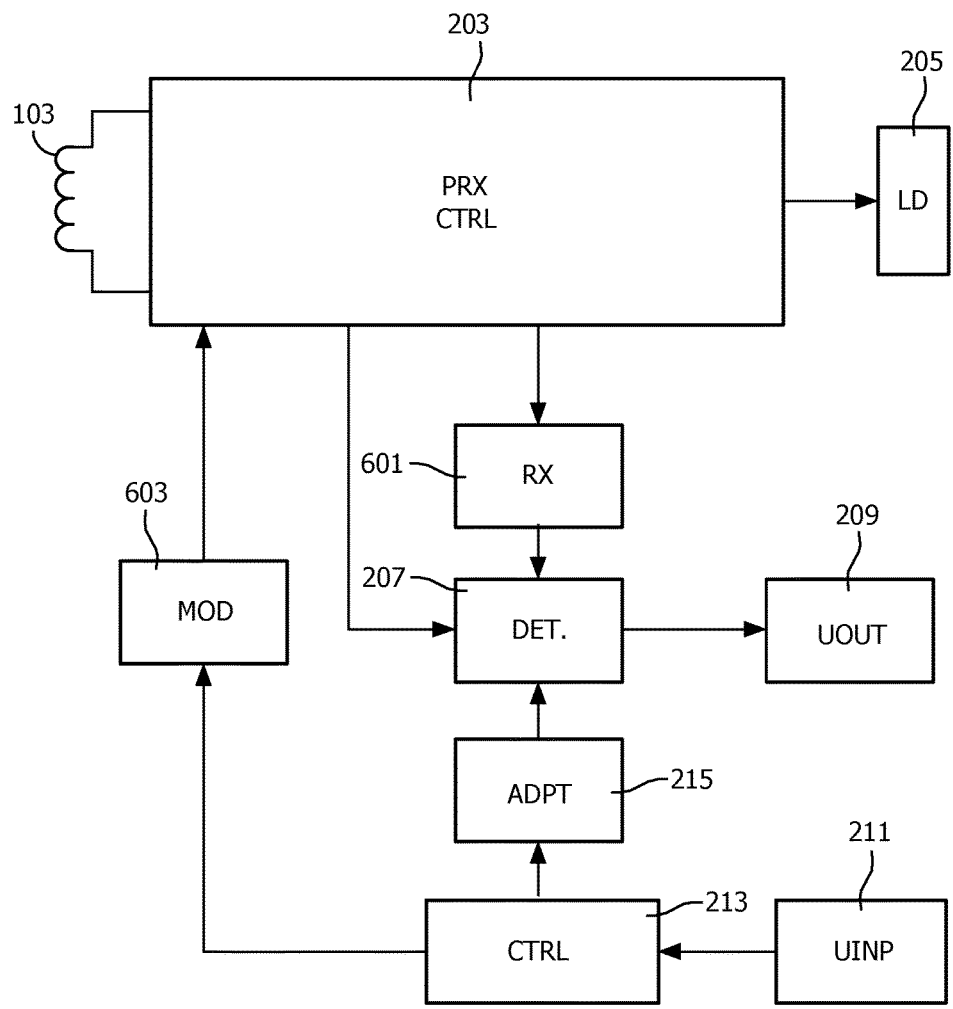
FIG. 6 illustrates an example of a power receiver in accordance with some embodiments of the invention.

FIG. 6 illustrates an example of a power receiver 105 for embodiments where most or all of the functionality for addressing potentially unacceptable parasitic power losses is comprised in the power receiver 105. In FIG. 6, the functions corresponding to the functions described for FIG. 2 are denoted by the same reference signs.

In the example, the power receiver 105 comprises a message receiver 601 that can receive messages from the power transmitter 101. The specific approach used for communicating data from the power transmitter 101 to the power receiver 105 may be different in different embodiments, and a number of different approaches will be known to the skilled person. For example, a small amplitude modulation may be applied to the power signal and the message receiver 601 may detect the amplitude variations and determine the data therefrom.

The message receiver 601 is coupled to the parasitic power loss detector 207, which in the example is at least partly comprised in the power receiver 105.

In some embodiments, the power transmitter 101 may be arranged to perform an evaluation and a detection of a parasitic power loss. It may further be arranged to transmit a message to the power receiver 105 to indicate the occurrence of a detection. Such a message may be received by the message receiver 601 and forwarded to the parasitic power loss detector 207.

Specifically, the message receiver 601 may detect that a non-acknowledge, or no acknowledge message has been received, and it may forward the indication of a parasitic power loss detection implied by this to the parasitic power loss detector 207.

Thus, in some embodiments, the power transmitter 101 may transmit a power loss indicator that indicates that the power transmitter 101 has determined a positive parasitic power loss which meets a detection criterion. The power loss indicator may specifically be provided by the presence of a non-acknowledge message, or the absence of an acknowledge message.

In such an example, the parasitic power loss detection may simply be generated by the parasitic power loss detector 207 in response to receiving the power loss indicator (e.g. by not receiving the acknowledge message). It will be appreciated that for such a scenario, the parasitic power loss detector 207 may be considered to be part of the power transmitter 101, of the power receiver 105 or indeed may be distributed across the power transmitter 101 and power receiver 105.

In other embodiments, the power loss indicator may be indicative of a parasitic power loss estimate that has been generated by the power transmitter 101. E.g., the power transmitter 101 of a Qi type power transfer will have information of both the transmit power estimate (which can be generated based on values that can be measured by the power transmitter 101) and of the receive power estimate (which is received from the power receiver 105). It may accordingly, generate the parasitic power loss estimate as the difference between these and it may transmit the resulting value to the power receiver 105.

The message receiver 601 may feed the received parasitic power loss estimate to the parasitic power loss detector 207 which may proceed to compare it to a detection threshold to determine whether a parasitic power loss detection has occurred or not.

In such an approach, the parasitic power loss estimate is thus calculated in the power transmitter 101 but the detection evaluation and decision is implemented in the power receiver 105.

In many embodiments, the power transmitter 101 may transmit an indication of the transmit power estimate to the power receiver 105. The indication is fed to the parasitic power loss detector 207 by the message receiver 601.

The parasitic power loss detector 207 may further locally receive or determine the receive power estimate and may accordingly proceed to calculate the parasitic power loss estimate. This can then be compared to the detection threshold to generate a detection if the detection threshold is exceeded. Thus, in this example, the parasitic power loss detector 207 is arranged to detect the parasitic power loss in response to a comparison of a transmit power measure received from the power transmitter 101 and a receive power estimate which is locally generated by the power receiver 105. The receive power estimate is indicative of the power extracted from the power signal by the power receiver, where the power may include the power consumption of the load, the power consumption of the power receiver circuits, and in many embodiments also power losses due to e.g. induction of current in conductive parts of the power receiver 105.

The approach may provide a highly advantageous operation in many scenarios and may allow estimates to be generated were it is most convenient (e.g. due to the right data being readily available).

In order to transmit the information from the power transmitter 101 to the power receiver 105, a suitable message should be used.

In the example where a power loss indicator is transmitted which is indicative of the parasitic power loss estimate, the power loss indicator may specifically be transmitted as the following message (which specifically may have a header of 0x09).

| | $b_7$ | $b_6$ | $b_5$ | $b_4$ | $b_3$ | $b_2$ | $b_1$ | $b_0$ |
|---|---|---|---|---|---|---|---|---|
| $B_0$ | | | | Power Loss Value | | | | | with the following possible definition of the Power Loss Value (corresponding to the parasitic power loss estimate).

Power Loss Value:

The (two's complement) signed integer value contained in this field ranges between −128 . . . +127 and indicates the average amount of power loss that the power transmitter estimates as result of the difference between the transmitted and received power, e.g. both determined in the time window indicated in a Configuration Packet. This power loss ($P_{loss}$) is calculated as follows:

$$P_{loss} = P_{transmitted} - P_{received} = \left(\frac{\text{power loss Value}}{128}\right)W.$$

In case $P_{loss}$ is too large or too small to code with the Power Loss Value, the most extreme value is applied, respectively +127 or −128.

In the example where the transmit power estimate is transmitted from the power transmitter 101 to the power receiver 105, this may be done using the following message (which may have the header 0x21):

| | $b_7$ | $b_6$ | $b_5$ | $b_4$ | $b_3$ | $b_2$ | $b_1$ | $b_0$ |
|---|---|---|---|---|---|---|---|---|
| $B_0$ | | | Transmitted Power Value (MSB) | | | | | |
| $B_1$ | | | Transmitted Power Value (LSB) | | | | | | with the following possible definition of the Transmitted Power Value (corresponding to the parasitic power loss estimate).

Transmitted Power Value:

The 16-bit unsigned integer contained in this field indicates the average amount of power that the power transmitter transmits through its Interface Surface (in the transmit power estimate), in the time window indicated in the Configuration Packet. This amount of power is calculated as follows:

$$P_{transmitted} = \left(\frac{\text{Transmitted Power Value}}{32768}\right) \times \left(\frac{\text{Maximum Power}}{2}\right) \times 10^{power\ Class} W.$$

Here, Maximum Power and Power Class are values contained in the Configuration Packet In systems such as Qi, the basic design philosophy is that the power receiver is in control of the communication link, and that the power transmitter only sends packets on request of the power receiver.

In such systems, such requests can be made implicit, e.g. by requiring the power transmitter to communicate the transmit power estimate, or transmitted power directly after the power receiver has communicated the receive power estimate.

In some embodiments, the request may be made explicit by the power receiver 105 transmitting and applying a dedicated Request Packet, such as e.g.:

| | $b_7$ | $b_6$ | $b_5$ | $b_4$ | $b_3$ | $b_2$ | $b_1$ | $b_0$ |
|---|---|---|---|---|---|---|---|---|
| $B_0$ | | | | Request | | | | |

The packet contains a single-byte payload, which may be used to indicate a command type as follows:

| Request | Command Type | Description |
|---|---|---|
| 0x20 | ID request | RX requesting TX Identification |
| 0x21 | Configuration request | RX requesting TX Configuration |
| 0x22 | transmitted power Request | RX requesting TX transmitted Power |

In embodiments where a significant amount of the parasitic power loss detection functionality is located in the power receiver 105, the power transmitter 101 may accordingly provide a power loss indicator to the power receiver 105 which the power receiver 105 can use for the processing.

Figure 7:
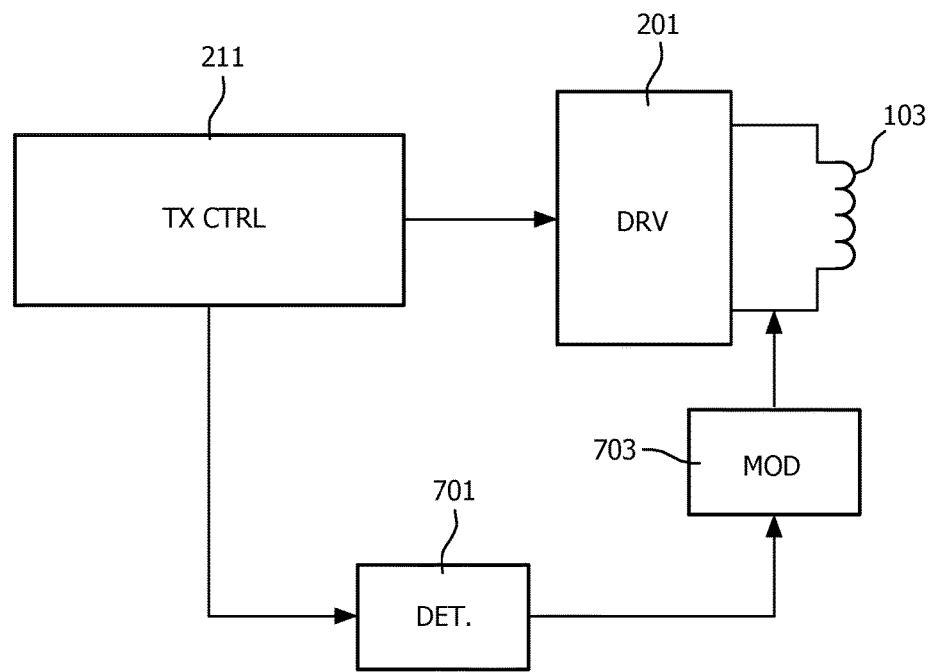
FIG. 7 illustrates an example of a power transmitter in accordance with some embodiments of the invention.

FIG. 7 illustrates an example of a power transmitter 10 which may generate and transmit the required information to the power receiver 105.

The power transmitter 101 of FIG. 7 comprises a transmit controller 211, a driver 201 and a transmit coil 103 in direct correspondence with the power transmitter 101 of FIG. 5. The transmit controller 211 is coupled to a parasitic power loss processor 701 which is arranged to determine a parasitic power loss indicator for the power transfer. The power loss indicator may in some embodiments specifically reflect a parasitic power loss estimate indicative of the estimated difference between the transmitted power and the receiver power. In others it may reflect a transmit power estimate indicative of the estimated transmit power of the power signal. In other embodiments, it may correspond to a detection indicator which indicates that a parasitic power loss detection has occurred (i.e. in the latter example the parasitic power loss processor 701 may comprise the parasitic power loss detector 207).

The parasitic power loss processor 701 is coupled to a transmitter 703, which is capable of transmitting the power loss indicator to the power receiver 105, e.g. using an amplitude modulation of the power signal or by withholding one or more acknowledge messages for messages received from the power receiver.

The power receiver 105 may then receive and use the power loss indicator as previously described.

It will be appreciated that in some embodiments, the power transmitter 101 of FIG. 7 may comprise further functionality previously described with respect to the power transmitter 101 of FIG. 5. For example, it may comprise the adaptation controller 213, functionality for receiving user inputs from the power receiver 105, etc. In some embodiments, the power transmitter 101 may not comprise any of these functions. Thus, in some embodiments, the power transmitters 101 contribution to the foreign object detection and operation may be restricted to providing a suitable power loss indicator. In such embodiments, the foreign object operation is thus performed in the power receiver 105 (apart from the communication of the power loss indicator).

When the parasitic power loss detector 207 of FIG. 6 detects a parasitic power loss, it provides a control signal to the user indicator unit 209 which generates a user alert. The input unit 211 then receives a user input.

In some embodiments, the power receiver 105 may directly communicate this user input to the power transmitter 101 without any processing. Thus, in such embodiments, the decision of how to proceed, as well as the initiation of the required operations, is performed in and by the power transmitter 101. Specifically, the power transmitter 101 may decide whether to proceed with the power transfer or whether to terminate the power transfer and initialize an adaptation/calibration.

In some embodiments, the power receiver 105 may provide at least some of the decision and adaptation functionality. For example, the power receiver 105 may comprise (at least part of) the adaptation controller 213.

Indeed, in the example of FIG. 6, the power receiver 105 comprises the adaptation controller 213, which evaluates the user input. Furthermore, in order to be able to communicate data to the power transmitter 101, the power receiver 105 of FIG. 6 further comprises a modulator 603 for load modulating the power signal in response to the data to be communicated.

If a user input is received which indicates that a foreign object is/was present, the adaptation controller 213 may continue to initiate a reduction of the power of the power signal to a safe level. In some embodiments, the adaptation controller 213 may achieve this by communicating at least one power down request to the power transmitter 101.

In the extreme case, the power down request may be a request for termination of the power transfer (such as a standard power termination message), i.e. the power down may correspond to a removal of the power signal.

In other embodiments or scenarios, the adaptation controller 213 may request the power to be reduced to a lower level while allowing the power transfer to proceed at this lower level.

In some embodiments, the detection of a parasitic power loss may cause the power receiver 105 to transmit power loop power control error messages to the power transmitter 101, which reduce the power of the power signal to a level where the parasitic power loss estimate is below the detection threshold. Thus, in such embodiments, the power receiver 105 may simply proceed to reduce the power of the power signal by using standard power control loop messages requesting a power reduction.

In such embodiments, the adaptation controller 213 may transmit power control loop power down requests to the power transmitter 101 until the estimated parasitic power loss meets a criterion—which specifically may be that the parasitic power loss estimate falls below a second threshold that is lower than the detection threshold.

If a user input is received which indicates that no foreign object is present (i.e. it indicates a false detection), the adaptation controller 213 may in some embodiments continue the power transfer without any changes, i.e. the power transfer may continue at the current power level.

However, the adaptation controller 213 will initiate an adaptation of the parasitic power loss detection. In some embodiments, the initiation of the adaptation may be achieved by transmitting a request for adaptation/calibration to the power transmitter 101. For example, the previously described request for calibration message may be used.

The adaptation request may in some embodiments be a non-specific message and the power transmitter 101 may determine which parameter is adapted. However, in other embodiments, the adaptation request may request that a specific parameter is modified, such as the transmit power estimate or a parameter/model used to generate this, or the detection threshold in case detections are performed in the power transmitter 101.

In some embodiments, the actual adaptation may (only) be performed in the power transmitter 101, and specifically may only be performed by the power transmitter 101 adapting its determination of the transmit power estimate (e.g. by biasing towards lower values, e.g. by adding a negative offset).

However, in the example of FIG. 6, the power receiver 105 may be arranged to adapt its local parasitic power loss detection operation. Specifically, the power receiver 105 comprises the adaptation unit 215, which may perform an adaptation by modifying the operation of the parasitic power loss detector 207. Specifically, in embodiments wherein the parasitic power loss detector 207 generates the parasitic power loss estimate from a received transmit power estimate and a locally generated receive power estimate, the adaptation unit 215 may adapt the processing by modifying the determination of the receive power estimate, the determination of the parasitic power loss estimate, or the detection threshold. For example, the receive power estimate may be biased towards higher values (e.g. by adding a positive offset), the parasitic power loss estimate may be biased towards lower values (e.g. by adding a negative offset), and/or the detection threshold may be biased towards lower values (e.g. by adding a negative offset). Thus, the adaptation biases the parasitic power loss detector 207 towards fewer or less likely detections in case no foreign object is exposed to the magnetic field (false positives) and/or towards better detections of parasitic power loss in case a foreign object is exposed to the magnetic field (false negatives).

In some embodiments, the local adaptation may only be performed in the power receiver 105 (or only in the power transmitter 101) but in other embodiments the adaptation may be performed in both the power transmitter 101 and the power receiver 105, e.g. by biasing and modifying both the transmit power estimate and the receive power estimate. In some embodiments, the power transmitter 101 and power receiver 105 may enter a negotiation to determine how the adaptation/modification is distributed across the devices.

The adaptation/calibration will in most embodiments be specific to the pairing of the power transmitter 101 and the power receiver 105. The compensation values may accordingly be stored in the power transmitter 101 and/or the power receiver 105 and may be retrieved and applied when the specific pairing occurs. For this purpose, the power receiver 105 may communicate its identity to the power transmitter 101, and likewise the power transmitter 101 may communicate its identity to the power receiver 105.

The described approaches may provide a substantial improvement for a power loss based method of foreign object detection. The approach may keep the user inconvenience to a minimum by requesting user intervention only in the case of a perceived unsafe situation. Further, only a simple yes/no decision requiring no technical understanding by the user is required. In addition, the method allows for a larger uncertainty on the received power estimate and transmitter power estimate (and thus cheaper implementations) as the method enables these estimates to be adapted/(re-)calibrated when necessary.

The previous embodiments have represented scenarios wherein the parasitic power loss detector 207 was arranged to generate a parasitic power loss detection if the parasitic power loss estimate exceeds a threshold. Thus, in the embodiments, the parasitic power loss detector 207 generated a parasitic power loss detection if the parasitic power loss estimate was outside a range defined by an upper value. The approach may specifically be used to reduce the sensitivity of the parasitic power loss detection, i.e. to reduce the probability of the detection indicating that parasitic power loss is too high, and that a foreign object may be present.

However, in other embodiments, the parasitic power loss detector 207 may alternatively or additionally be arranged to detect if the parasitic power loss estimate is too low. Thus, it may generate a parasitic power loss detection which indicates that the parasitic power loss estimate is below a threshold, i.e. that it is below the lower value of a range.

In such cases, the system may determine that the sensitivity of the parasitic power loss detection operation is too low and that there is a potential risk that the foreign objects may not be detected. Therefore, the system may proceed in the same way as described in the previous embodiments, and it may specifically generate a user alert and request a user input. Dependent on the user input, the system may then proceed to perform an adaptation or not.

If an adaptation is performed, this will be in the direction of increasing the probability of detecting that a power loss is above a threshold, i.e. it will increase the probability of a foreign object detection. The approach may accordingly be used to increase the sensitivity and thus to prevent missed foreign object detections.

In many embodiments, the parasitic power loss detector 207 may be arranged to generate a parasitic power loss detection if the parasitic power loss estimate is below a first threshold or if it is above a second threshold. Thus, the first and second thresholds define a range and the parasitic power loss detection is generated if the parasitic power loss estimate falls outside this range.

If so, the system generates a user alert and receives an input on whether adaptation should be performed. If so, the system proceeds to adapt the approach for generating the parasitic power loss detection. If the parasitic power loss estimate exceeds the upper value, it may proceed to adapt the approach as previously described, e.g. it may increase the upper value, reduce the transmit power estimate or increase the receive power estimate. This may reduce the probability of foreign object detection, and may thus reduce the number of "false positives".

However, if the parasitic power loss detection is due to the parasitic power loss estimate being below the lower value of the range, the adaptation may proceed in the opposite direction, i.e. it may increase the probability of foreign object detection. Specifically, it may reduce the lower value, increase the transmit power estimate or decrease the receive power estimate. In some embodiments, it may also decrease the upper value of the range.

In this way, the sensitivity of the parasitic power loss detection may be dynamically adapted in both directions thereby allowing improved performance.

In many embodiments, it may be desirable to adapt both the upper and lower values of the range in response to a parasitic power loss detection, whether this is due to the parasitic power loss estimate being below or above the range. However, in both scenarios, the modification of a parameter of the parasitic power loss detection operation is only performed if the user indicates that no foreign object is present.

For example, in many embodiments, it may be desirable for the range to have a fixed size but with the interval of the range being adapted. For example, if the parasitic power loss estimate exceeds the upper value and adaptation should be performed, both the lower value and the upper value of the range may be increased. Similarly, if the parasitic power loss estimate is below the lower value and adaptation should be performed, both the lower value and the upper value of the range may be decreased.

As a specific example, the system may in many embodiments compare the generated parasitic power loss estimate to a range which has both a lower value and an upper value. The lower value may specifically be a negative value whereas the upper value may be a positive value.

For example, in some embodiments, the power receiver 105 may report the receive power estimate with an accuracy of between 0 to 350 mW, i.e. the power receiver 105 may be required to never underestimate the power loss but may be assumed to only be accurate within a power interval of 350 mW. The power transmitter 101 may generate a transmit power estimate which has an accuracy of ±75 mW. In such an embodiment, the parasitic power loss estimate may thus be within a range of 75 mW to −425 mW when there is no foreign object present. Thus, assuming that these inaccuracies include all the possible deviations (i.e. includes both measurement inaccuracies, model inaccuracies, processing inaccuracies (e.g. due to quantization etc.) etc.), the parasitic power loss estimate when no foreign object is present should not be below −425 mW and not above 75 mW. Accordingly, these end-points may be used for the range, i.e. the acceptable range for the parasitic power loss estimate may be set to be [−425 mW; 75 mW] as exemplified by FIG. 8.

Figure 8:
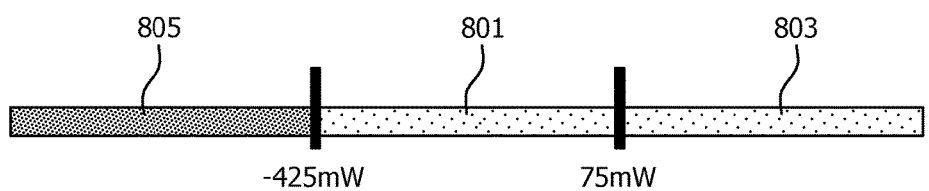
FIG. 8 illustrates an example of a range used for parasitic power loss detection in a power transfer system in accordance with some embodiments of the invention.

Thus, in the example, the parasitic power loss estimate may be generated by the parasitic power loss detector 207 by subtracting the received receive power estimate from the locally generated transmit power estimate. The resulting parasitic power loss estimate may fall into three regions as illustrated in FIG. 8. In the middle region 801, the parasitic power loss is within the expected range of [−425 mW; 75 mW]. This is the acceptable range, and according the power transfer will continue unchanged and without interruption.

If the parasitic power loss estimate is in the upper region 803, i.e. with a parasitic power loss estimate of more than 75 mW, the parasitic power loss estimate exceeds the range and accordingly a power loss detection has occurred. The power transmitter 101 then proceeds to obtain a user input which indicates whether a foreign object is present or not. If the user indication does indicate the presence of a foreign object, the power transmitter 101 proceeds to terminate the power transfer etc. as previously described (or does not restart the power transfer if this has already been terminated upon the parasitic power loss detection).

However, if the user indicates that no foreign object is present, the generated parasitic power loss estimate has exceeded the range of inaccuracy that has been assumed. Thus, the generated parasitic power loss estimate has exceeded the range that it should be within when no foreign object is present. Accordingly, the power transmitter 101 initiates an adaptation in order to adapt the power loss detection operation such that such false positive detections are less likely. The power transmitter 101 specifically initiates an adaptation wherein a parameter of the power loss detection operation is modified. Typically, the user indication will also include or be an indication that the power transmitter 101 and the power receiver 105 are positioned correctly with respect to each other. Thus, in many embodiments, the adaptation will only be commenced if the user indicates that there are no foreign objects and that the power transmitter 101 and the power receiver 105 are correctly positioned relative to each other.

The generated parasitic power loss estimate may also be in the lower region 805, i.e. it may have a value of less than −425 mW. Thus, in such a situation, the parasitic power loss estimate has a value that is lower than is expected due to the variations due to measurement and processing noise, component tolerances etc. In this case, the parasitic power loss estimate exceeds the range and a user input is requested. The user input may indicate that the no foreign object is present (and e.g. that the power transmitter 101 and power receiver 105 are positioned well relative to each other). The power transmitter 101 may then proceed to perform an adaptation seeking to reduce the probability of the parasitic power loss estimate being lower than the range.

Thus, in the system, the parasitic power loss estimate may be above the upper value of the range indicating that the detection operation is either too sensitive (a false detection) or that a foreign object is present. The parasitic power loss estimate may also be below the lowest value indicating that the operation is not sensitive enough (e.g. even a parasitic power loss of 0.5 W may not be detected). If the parasitic power loss estimate exceeds the expected range without a foreign object being present, the system may proceed to perform an adaptation which seeks to bias the detection in the opposite direction. E.g. if a false positive detection has occurred, the system seeks to bias the detection towards fewer detections, and if a parasitic power loss estimate which is too low has been detected, the system seeks to bias the detection towards more detections. The power transmitter 101 specifically initiates an adaptation wherein a parameter of the power loss detection operation is modified.

It will be appreciated that the adaptation may as previously described adapt the model (e.g. a function or equation) used to generate the parasitic power loss estimate and/or the range which is used for detection.

As an example, the adaptation may be performed in the power transmitter 101 such that the parasitic power loss estimate will be shifted towards the center of the range.

For example, the adaptation unit 215 may first determine how much the parasitic power loss estimate $P_{loss}$ deviates from the center of the range. The deviation $\Delta x$ may be calculated as $$\Delta x = P_{loss} - P_{center}$$

with $$P_{center} = (P_{loss-upper} + P_{loss-lower})/2$$

where $P_{loss-upper}$ is the upper value of the range and $P_{loss-lower}$ is the lower value of the range.

Thus, in the specific example:
$P_{loss-upper}$=75 mW
$P_{loss-lower}$=−425 mW
$P_{loss-center}$=−175 mW In this example, no adaptation is performed if the parasitic power loss estimate is within the acceptable range, i.e. if $P_{loss-lower} < P_{loss} < P_{loss-upper}$.

However, if the parasitic power loss estimate is higher than the upper value (i.e. $P_{loss} > P_{loss-upper}$) or lower than the lower value (i.e. $P_{loss} < P_{loss-lower}$) then the deviation $\Delta x$ from the center is calculated and used in adapting the detection operation.

For example, if $P_{loss}$=100 mW (i.e. the detection is too sensitive) then $\Delta x$=+275 mW. If $P_{loss}$=−500 mW (i.e. the detection is too insensitive) then $\Delta x$=−325 mW The adaptation unit 215 may then proceed to adapt the parasitic power loss detection.

For example, it may adjust the range such that the current parasitic power loss estimate is in the middle of the new range. Thus, the currently determined parasitic power loss estimate is considered to be an average measurement, and as it is known that there are no foreign object present (due to the user input), the current measurement is used as a reference. For example, the new end points of the range may be determined as:

$$P'_{loss-upper} = P_{loss-upper} + \Delta x$$

$$P'_{loss-lower} = P_{loss-lower} + \Delta x$$

For the example of a parasitic power loss estimate of $P_{loss}$=100 mW and thus $\Delta x$=+275 mW, the following new values are generated:
$P'_{loss-upper}$=350 mW
$P'_{loss-lower}$=−150 mW
resulting in $P'_{center}$=100 mW=$P_{loss}$ For the example of a parasitic power loss estimate of $P_{loss}$=−500 mW and thus $\Delta x$=−325 mW, the following new values are generated:
$P'_{loss-upper}$=−250 mW
$P'_{loss-lower}$=−750 mW
resulting in $P'_{center}$=−500 mW=$P_{loss}$ As another example, the adaptation unit 215 may instead of adapting the range, proceed to adapt the models (equations/functions) for determining the transmit power estimate or the parasitic power loss estimate.

For example, an offset may be introduced to the transmit power estimate, the receive power estimate, or the parasitic power loss estimate, such as e.g:

$$P'_{PT} = P_{PT} - \Delta x,$$

$$P'_{PR} = P_{PR} + \Delta x, \text{ or}$$

$$P'_{loss} = P_{loss} - \Delta x.$$

As another example, the model for calculating the transmit power estimate may be modified by introducing a compensation factor, e.g.:

$$P'_{PT} = P_{PT} \cdot (1 - \Delta x / P_{PTref}),$$

where $P_{PT}$ is the transmit power estimate of the previous model (e.g. based on supply current and voltage to the inverter) and $P_{PTref}$ is the transmit power estimate at an operating point where the power loss differs $\Delta x$ from the centre of the range. Preferably, this operating point is representative for the whole power range.

At the operating point where the power loss estimate differs $\Delta x$ from the centre of the range, the transmit power estimate needs to be corrected with $P'_{PTref} = P_{PTref} - \Delta x$. Rewriting this using a correction factor (CF) yields $P'_{PTref} = P_{PTref} \cdot CF = P_{PTref} \cdot (1 - \Delta x / P_{PTref})$. Applying this correction factor to all operating points, i.e. $P'_{PT} = P_{PT} \cdot CF$, results in $P'_{PT} = P_{PT} \cdot (1 - \Delta x / P_{PTref})$.

As another example, a correction factor may be applied to the receive power, e.g.:

$$P'_{PR} = P_{PR} \cdot (1 + \Delta x / P_{PTref})$$

In many embodiments, the adaptation/calibration may proceed to determine suitable values for a range of different operating points. Thus, when an adaptation/calibration is initiated, the adaptation unit 215 may not (only) use the data which resulted in the parasitic power loss estimate that caused the adaptation to be initiated, but may proceed to set a number of different operating points and generate e.g.

suitable compensation parameters for each of these operating points. The system may then during future power transfers use the compensation parameters that are suitable for the specific operating point. In addition, compensation parameters for other operating points may e.g. be determined by interpolation between the compensation parameters determined for the specific operating points of the calibration.

Although such an approach may provide substantially improved foreign object detection in many scenarios and embodiments, the approach may in many embodiments be improved by determining the compensation parameters for the detection algorithm based on multiple adaptations.

Specifically, the inventors have realized that a particular difficulty in calibrating a power transfer system is the variability in the relative positioning of the power transmitters and power receivers and the impact that this may have on the foreign object detection.

The issue may be illustrated by FIGS. 9-13.

Figure 9:
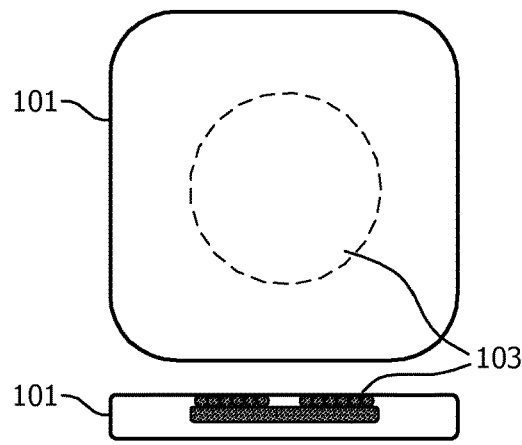
FIG. 9 illustrates two views of a possible power transmitter device.
Figure 10:
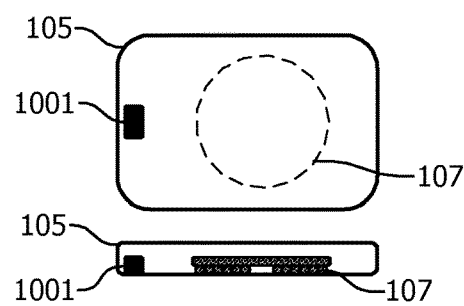
FIG. 10 illustrates two views of a possible power transmitter device.

Specifically, FIG. 9 illustrates a top view and a cross sectional view of a power transmitter 101 comprising a transmit coil 103. The position of the transmit coil 103 is shown in outline on the top view by a dashed circle. FIG. 10 illustrates a top view and a cross sectional view of a power transmitter 105 comprising a receive coil 107. The position of the receive coil 107 is shown in outline on the top view by a dashed circle. The power receiving device contains a metal part 1001.

Figure 11:
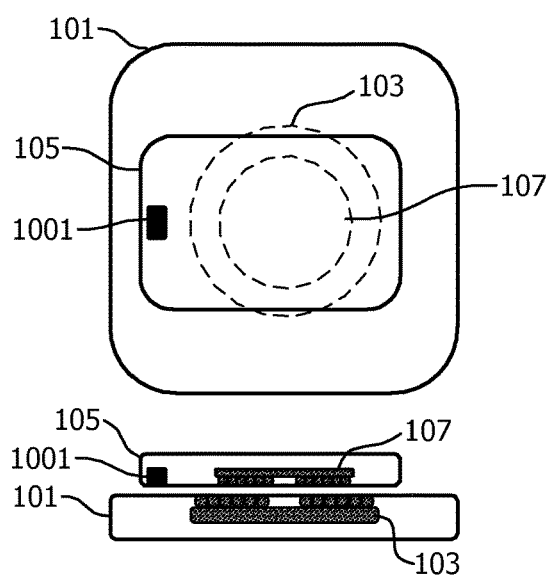
FIGS. 11-13 illustrates views of a power transfer system wherein a power receiver device is positioned on a power transmitter device for powering.

FIG. 11 illustrates an example of the power receiver 105 positioned on the power transmitter 101 during a power transfer. In the example, the transmitter coil 103 is aligned to the receiver coil 107. Furthermore, the metal part 1001 is only exposed to a very weak magnetic field and accordingly the power absorption in the metal part 1001 is minimal.

Figure 12:
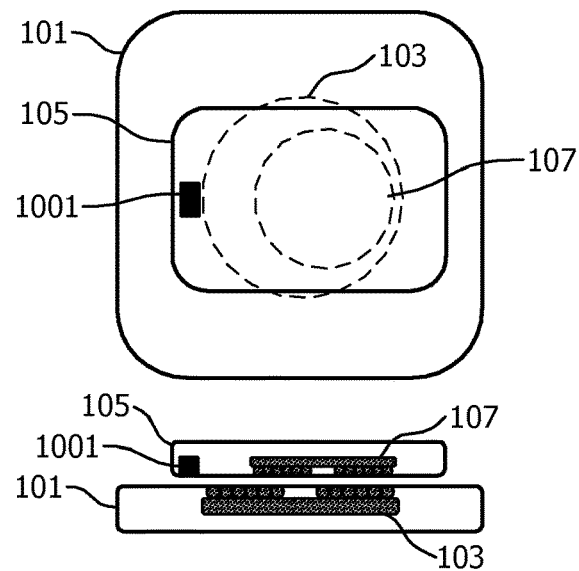

FIG. 12 illustrates another example of the power receiver 105 positioned on the power transmitter 101 during a power transfer. In this example, the transmitter coil 103 is offset relative to the receiver coil 107. Furthermore, the metal part 1001 is exposed to a stronger magnetic field and accordingly the power absorption in the metal part is increased although it may still be acceptable.

Figure 13:
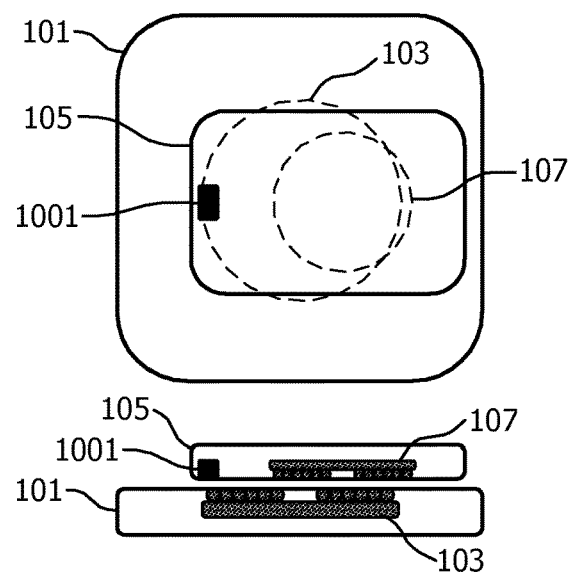

FIG. 13 illustrates another example of the power receiver 105 positioned on the power transmitter 101 during a power transfer. In this example, the transmitter coil 103 is further offset relative to the receiver coil 107. Furthermore, the metal part 1001 is exposed to an even stronger magnetic field and accordingly the power absorption in the metal part is increased further. In the specific example, the offset may be unacceptable and may lead to an unacceptable amount of power dissipation in the metal object 1001.

Thus, three situations are considered, one where there is virtually no power loss in the metal part 1001, one where the loss is significant but acceptable, and one where it is not acceptable. Suppose a power receiver can accurately measure the power received by the receive coil, but cannot measure the power loss in the metal part 1001, the power receiver will make an error in reporting the total received power depending on variation in the power loss in the metal part 1001. A given power receiver 105 is likely to report the same received power estimates for in the three different scenarios with three different accuracies. Accordingly, a calibration based on a single position may result in suboptimal performance. For example, if the calibration is performed based on the third scenario, the system may not be able to detect some power loss detections, i.e. it will be too insensitive. Indeed, in the third scenario, the metal part 1001 may be considered a foreign object as it dissipates unacceptable amounts of power. However, the system will not be able to detect this unacceptable power dissipation. As a second example, if the calibration is performed based on the first scenario, the system may be too sensitive and could trigger on the power loss in the metal part 1001 in the second scenario.

One approach to address this may in many scenarios be for the user input to specifically indicate that the power receiver is positioned correctly. For example, the power transmitter 101 may provide a user indication which requests that the user confirm that the position of the power receiver 105 is correct (i.e. well aligned with the power transmitter 101) and that there are no foreign objects present. If the user provides a user input to confirm this, the adaptation controller 213 proceeds to initiate the adaptation, e.g. by adapting a parameter as described above. Thus, the adaptation controller 213 may be arranged to initiate the adaptation only if the user input comprises an indication of a user confirmation of a suitable positioning of the power receiver for power transfer.

In many embodiments, the adaptation unit 215 may specifically be arranged to determine parameters for adapting the power loss detection operation based on multiple initiated adaptations. Thus, rather than merely performing the adaptation based on the current measurements or calibration, one or more previous calibrations may also be taken into account.

For example, rather than merely set the range end-points symmetrically around the parasitic power loss estimate determined for the current adaptation, the system may instead proceed to perform a more gradual adaptation. Thus, in some embodiments a gradual change of one or more parameters of the parasitic power loss detection operation is performed. Specifically, a relative change of the parameter may be applied in each iteration. For example, the range may be moved relative to the parasitic power loss estimate (or vice versa) but only by a value which is less than the total difference between the current parasitic power loss estimate and the center of the range.

For example, the new end-points of the range may be determined as:

$$P'_{loss\text{-}upper} = P_{loss\text{-}upper} + \Delta x \cdot \alpha$$

$$P'_{loss\text{-}lower} = P_{loss\text{-}lower} + \Delta x \cdot \alpha$$

where $\alpha$ is less than 1 and is selected to result in a given speed of the adaption. Thus, each adaptation biases the range towards a position that is symmetric around the current parasitic power loss estimate but with a bias that is typically substantially less than the difference $\Delta x$. As multiple adaptations are performed, the system will gradually adapt towards a scenario wherein the range is positioned symmetrically around an averaged parasitic power loss estimate.

Such an approach may provide increased reliability and accuracy. Specifically, it may allow the adaptation to reflect multiple positions of the power receiver 105 relative to the power transmitter 101, and it will thus tend to result in the risk of the detection being calibrated for an unusual or undesirable position being reduced. Indeed, the approach will tend to bias the adaptation and calibration towards a typical position of the power transmitter 101 and power receiver 105.

It will be appreciated that the determination of compensation parameters over a plurality of adaptations may alternatively be used to adapt the model for determining the parasitic power loss estimate rather than (or indeed as well as) adapting the range.

For example, the parasitic power loss estimate, transmit power estimate or receive power estimate may be gradually adapted by further using an adaptation factor. For example, the function for generating the transmit power estimate, the receive power estimate or the parasitic power loss estimate may be invarient but with an adaptation being provided by updating a compensation offset factor β to the determined transmit power estimate, receive power estimate or the parasitic power loss estimate, i.e.:

$$P'_{PT}=P_{PT}-\beta,$$

$$P'_{PR}=P_{PR}+\beta \text{ or}$$

$$P'_{loss}=P_{loss}-\beta$$

where β is updated in each adaptation according to:

$$\beta'=\beta+\Delta x \cdot \alpha$$

Thus, in these examples, either the range or the model for determining the parasitic power loss estimate are biased towards the parasitic power loss estimate being at the midpoint of the range. It will be appreciated that in other embodiments, the bias may be towards a different point in the range. For example, Δx may be calculated as the difference to e.g. a point being ⅓ of the size of the range from the lower end-point and ⅔ from the upper end-point.

In some embodiments, the system may simply perform a (possibly weighted) averaging of the parasitic power loss estimates from e.g. the last N adaptations. An offset may then be introduced to the model for determining the parasitic power loss estimate or to the range in order to result in the parasitic power loss estimate being e.g. in the middle of the range.

E.g. as a specific example, the end-points of the range may be set to be 250 mW from the average parasitic power loss estimates of the last, say, five adaptations.

In many embodiments, the compensation parameters may be set and stored for the individual pairing of a power transmitter and a power receiver, i.e. the system may be arranged to individually calibrate the specific pairs of power receivers and power transmitters.

Such an approach may provide improved accuracy as both the specific characteristics of the individual power transmitter, the individual power receiver, and indeed the specific characteristics of using these together may be reflected in the compensation parameters.

However, in some embodiments, the adaptor 215 is arranged to determine at least one compensation parameter for the power loss detection operation based on initiated adaptations for a plurality of power receivers.

For example, the power transmitter 101 may for a plurality of power receivers proceed to determine the parasitic power loss estimate and update the model for determining the parasitic power loss estimate and/or the range as described above for multiple adaptations with the same power receiver 105.

Specifically, the adaptation unit 215 may proceed to update the range according to $$P'_{loss\text{-}upper}=P_{loss\text{-}upper}+\Delta x \cdot \alpha$$

$$P'_{loss\text{-}lower}=P_{loss\text{-}lower}+\Delta x \cdot \alpha$$

or the end points of the range (i.e. the detection thresholds), the parasitic power loss estimate or the transmit power estimate according to:

$$P'_{PT}=P_{PT}-\beta,$$

$$P'_{loss}=P_{loss}-\beta,$$

where β is updated in each adaptation according to: $\beta'=\beta+\Delta x \cdot \alpha$ but with the update being performed for each adaption regardless of which power receiver the power transmitter is providing power to the power receiver. Thus, in this example, the averaging effect is not only over the different adaptations, and thus different relative positions, but is also over multiple power receivers.

As the variations in the errors in the reported receive power estimate from the power receiver is likely to have an average of zero in most embodiments, such an averaging may reduce the impact of the power receiver variations. Accordingly, the approach may allow the power transmitter 101 to adapt the parasitic power loss detection to compensate for errors in the power transmitter 101.

For example, if the detector 207 generates a relatively high number of false positive detections for a range of different power receivers, it is likely that the detector is too sensitive due to a bias in the determination of the parasitic power loss estimate, and specifically in the determination of the transmit power estimate. Therefore, the power transmitter 101 may compensate this bias, e.g. by introducing an offset or changing the range as previously described.

Similarly, a given power receiver may determine a compensation parameter based on initiated adaptations for a plurality of power transmitters. For example, if the power receiver 105 is used with a range of different power transmitters and a relatively high number of false positive detections occur, it is likely that the sensitivity is too high due to a bias in the calculation of the receive power estimate by the power receiver 105.

Accordingly, the power receiver 105 may proceed to introduce a compensation to the generated receive power estimate. For example, it may apply the update $$P'_{PR}=P_{PR}+\beta$$

where β is updated in each adaptation (regardless of which power transmitter is supporting the power transfer) according to:

$$\beta'=\beta+\Delta x \cdot \alpha.$$

The independent compensation of the power receiver 105 and the power transmitter 101 may improve operation. In particular, it may provide improved accuracy of the detection when a new pairing of a power transmitter and power receiver occurs. In this example, the power transmitter and the power receiver may already be compensated for any bias relative to the "average" complementary device (i.e. the power transmitter is compensated for bias with respect to the average of the power receivers for which adaptations have been performed, and the power receiver is compensated for bias with respect to the average of the power transmitters for which adaptations have been performed). Thus, the detection parameters are already likely to be close to the optimal values, and very often no further adaptation will be needed.

The previous description have focused on embodiments where the detection of the parasitic power loss has been performed in the power transmitter or in the power receiver or with the detection being distributed between them. In some embodiments, detections may be performed in both the power transmitter and the power receiver. For example, a detector for detecting parasitic power losses may be implemented in both the power receiver and the power transmitter. In such embodiments, a detection of a power loss by either detector may be treated as a power loss detection. Thus, the previously described functionality may be mixed and combined in various embodiments, and specifically the different operations and functionality distributions may be performed in parallel.

For example, in many embodiments, a parasitic power loss detector 207 may be implemented in the power receiver which may proceed to detect power losses, generate user alerts, receive inputs, adapt the power loss estimates etc. In parallel, the power transmitter may also comprise a parasitic power loss detector 207 as described which may proceed to (possibly independently) detect power losses, generate user alerts, receive inputs, adapt the power loss estimates etc. Thus, in some embodiments, redundancy between the power transmitter and power receiver may be introduced in the parasitic power loss detection.

An advantage of some such approaches is that the power receiver, as a first safeguard, can take precautions to limit the power transfer (e.g. by using its control facility to control the power transfer via control error messages), interacting with the user (e.g. using a more advanced user interface), trigger the power transmitter for a calibration (by transmitting a calibration request message), etc., while the power transmitter, as a second safeguard, keeps its responsibility as power source to take action if unacceptable parasitic power loss occurs.

For example, the power receiver may pro-actively address a parasitic power loss to prevent the power transmitter e.g. terminating the power transfer. In case the power receiver would fail to do this, the power transmitter can, as a safety back-up, take over the control by terminating power transfer or limiting the power signal to a safe level.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A wireless power transfer system including a power transmitter configured to provide a power transfer to a power receiver via a wireless inductive power signal, the wireless power transfer system comprising:
   a parasitic power loss detector configured to perform a parasitic power loss detection operation to generate a parasitic power loss detection for the power transfer if a parasitic power loss estimate is outside a range;
   a user indicator to initialize a user alert in response to the parasitic power loss detection;
   an input to receive, in response to the parasitic power loss detection, a user input indicating a presence of a foreign object or an absence of the foreign object; and
   a controller configured to initiate an adaptation of a parasitic power loss detection operation performed by the parasitic power loss detector to generate the parasitic power loss detection, if the user input indicates an absence of the foreign object, and to not initiate the adaptation of the parasitic power loss detection operation, if the user input indicates a presence of the foreign object, the adaptation comprising, a modification of a parameter of the parasitic power loss detection operation.

2. The wireless power transfer system of claim 1 wherein the parasitic power loss detector is configured to generate the parasitic power loss detection if the parasitic power loss estimate has a value above an upper value of the range.

3. The wireless power transfer system of claim 1 wherein the parasitic power loss detector is configured to generate the parasitic power loss estimate from a power loss estimate model and to compare it to the range, and the wireless power transfer system comprises an adaptor for performing the adaptation, the adaptor being configured to modify at least one of a parameter of the model for determining the parasitic power loss estimate and the range.

4. The wireless power transfer system of claim 1 wherein the input is at least partially comprised in the power receiver.

5. The wireless power transfer system of claim 1 wherein the parasitic power loss detector is at least partially comprised in the power transmitter.

6. The wireless power transfer system of claim 1 wherein the parasitic power loss detector is at least partially comprised in the power receiver, and the power transmitter comprises a power estimator for generating a transmit power estimate for the power signal and a transmitter for transmitting the transmit power estimate to the power receiver, the power receiver comprises a receiver for receiving the transmit power estimate, and the parasitic power loss detector is configured to generate the parasitic power loss detection based on the transmit power estimate.

7. An apparatus for a wireless power transfer system including a power transmitter configured to provide a power transfer to a power receiver via a wireless inductive power signal, the apparatus comprising:
- a parasitic power loss detector configured to perform a parasitic power loss detection operation to generate a parasitic power loss detection for the power transfer if a parasitic power loss estimate is outside a range;
- a user indicator for initializing a user alert in response to the parasitic power loss detection;
- an input for, in response to the parasitic power loss detection, receiving a user input indicating a presence of a foreign object or an absence of the foreign object; and
- a controller configured to initiate an adaptation of a parasitic power loss detection operation performed by the parasitic power loss detector to generate the parasitic power loss detection if the user input indicates an absence of the foreign object, and to not initiate the adaptation of the parasitic power loss detection operation if the user input indicates a presence of the foreign object, the adaptation comprising a modification of a parameter of the parasitic power loss detection operation.

8. The apparatus of claim 7 further comprising an adaptor for performing the adaptation, the adaptor being configured to set parameters for the power loss detection operation based on multiple initiated adaptations.

9. The apparatus of claim 8 wherein the adaptor is configured to adapt at least one of a model for determining the parasitic power loss estimate and the range based on multiple initiated adaptations.

10. The apparatus of claim 9 wherein the adaptor is configured to modify at least one of the model for determining the parasitic power loss estimate and the range to bias a combined parasitic loss estimate for the multiple initiated adaptations towards a predetermined position in the range.

11. The apparatus of claim 9 wherein the adaptor is configured to adapt at least one of a model for determining a transmit power estimate for the power transmitter, a model for determining a power receive estimate for the power receiver, and at least one end-point of the range.

12. The apparatus of claim 8 wherein the adaptor is configured to set parameters for the parasitic power loss detection operation for individual pairings of a power transmitter and a power receiver.

13. The apparatus of claim 8 wherein the apparatus is the power transmitter and the adaptor is configured to determine at least one compensation parameter of the parameters for the parasitic power loss detection operation based on initiated adaptations for a plurality of power receivers.

14. The apparatus of claim 8 wherein apparatus is the power receiver and the adaptor is configured to determine at least one parameter of the parameters for the parasitic power loss detection based on initiated adaptations for a plurality of power transmitters.

15. The apparatus of claim 7 wherein the controller is configured to initiate the adaptation only if the user input comprises an indication of a user confirmation of a suitable positioning of the power receiver for power transfer.

16. The apparatus of claim 7 wherein the apparatus is the power receiver.

17. The apparatus of claim 16 wherein the parasitic power loss detector is configured to generate the parasitic power loss detection based on a power loss indicator received from the power transmitter.

18. The apparatus of claim 16 wherein the parasitic power loss detector is configured to generate the parasitic power loss detection in response to a lack of an acknowledgement for a message transmitted to the power transmitter by the power receiver.

19. The apparatus of claim 16 wherein the parasitic power loss detector is configured to generate the parasitic power loss detection based on a comparison of a transmit power measure received from the power transmitter and a receive power estimate indicative of a power extracted from the power signal by the power receiver.

20. The apparatus of claim 16 wherein the controller is configured to transmit an adaptation request message to the power transmitter in response to a user input indicating an absence of the foreign object being received.

21. The apparatus of claim 7 wherein the apparatus is the power transmitter.

22. The apparatus of claim 21 wherein the user indicator is configured to initialize the user alert by transmitting a user alert request message to the power receiver, the user alert request message requesting that the power receiver generates a user alert.

23. The apparatus of claim 21 wherein the input comprises a receiver for receiving an indication of the user input from the power receiver.

24. The apparatus of claim 21 further comprising an adaptor for performing the adaptation, the adaptor being configured to adapt at least one of a model for determining the parasitic power loss estimate and the range.

25. The apparatus of claim 21 wherein the power transmitter is configured to transmit an indication of parasitic power loss detection to the power receiver in response to the detection of the parasitic power loss.

26. The apparatus of claim 21 wherein the power transmitter is configured to transmit the indication of the parasitic power loss detection to the power receiver by withholding at least one acknowledge message for a message received from the power receiver.

27. A method of operation for a wireless power transfer system including a power transmitter configured to provide a power transfer to a power receiver via a wireless inductive power signal, the method comprising:
- performing a parasitic power loss detection operation to generate a parasitic power loss detection for the power transfer if a parasitic power loss estimate is outside a range;
- initializing a user alert in response to the parasitic power loss detection;
- receiving a user input in response to the parasitic power loss detection, the user input indicating a presence of a foreign object or an absence of the foreign object; and
- initiating an adaptation of a parasitic power loss detection algorithm to generate parasitic power losses if the user input indicates an absence of the foreign object, and not initiating the adaptation of the parasitic power loss detection operation if the user input indicates a presence of—thea foreign object, the adaptation comprising a modification of a parameter of the parasitic power loss detection operation.

* * * * *